United States Patent
Li et al.

(10) Patent No.: US 10,448,056 B2
(45) Date of Patent: Oct. 15, 2019

(54) SIGNALING OF QUANTIZATION INFORMATION IN NON-QUADTREE-ONLY PARTITIONED VIDEO CODING

(71) Applicant: QUALCOMM Incorporated, San Diego, CA (US)

(72) Inventors: Xiang Li, San Diego, CA (US); Jianle Chen, San Diego, CA (US); Rajan Laxman Joshi, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 30 days.

(21) Appl. No.: 15/646,959

(22) Filed: Jul. 11, 2017

(65) Prior Publication Data

US 2018/0020241 A1    Jan. 18, 2018

Related U.S. Application Data

(60) Provisional application No. 62/363,000, filed on Jul. 15, 2016.

(51) Int. Cl.
*H04N 19/70* (2014.01)
*H04N 19/124* (2014.01)
(Continued)

(52) U.S. Cl.
CPC .......... *H04N 19/70* (2014.11); *H04N 19/119* (2014.11); *H04N 19/124* (2014.11);
(Continued)

(58) Field of Classification Search
CPC .... H04N 19/70; H04N 19/119; H04N 19/124; H04N 19/129; H04N 19/13;
(Continued)

(56) References Cited

U.S. PATENT DOCUMENTS 9,001,889 B2 * 4/2015 Lu ................... H04N 19/159
375/240.03
9,161,046 B2 * 10/2015 Van der Auwera .... H04N 19/14
(Continued)

FOREIGN PATENT DOCUMENTS

WO     2016090568 A1    6/2016

OTHER PUBLICATIONS

International Search Report and Written Opinion—PCT/US2017/041739—ISA/EPO—dated Oct. 6, 2017.
(Continued)

*Primary Examiner* — Ayman A Abaza
(74) *Attorney, Agent, or Firm* — Shumaker & Sieffert, P.A.

(57) ABSTRACT

A video decoder receives local quantization information for a current quantization group. The video decoder determines a partitioning of a coding tree unit (CTU) of a picture of the video data into a plurality of coding units (CUs). Additionally, the video decoder derives, based at least in part on the local quantization information for the current quantization group, a quantization parameter. The current quantization group is defined as a group of successive CUs so that boundaries of the current quantization group must be boundaries of the CUs. The current quantization group may or may not be square. Additionally, the video decoder inverse quantizes, based on the quantization parameter, at least one transform coefficient of a current CU being in the current quantization group. The video decoder reconstructs, based on inverse quantized transform coefficients of the current CU, a coding block of the current CU.

60 Claims, 18 Drawing Sheets

(51) Int. Cl.
*H04N 19/129* (2014.01)
*H04N 19/13* (2014.01)
*H04N 19/18* (2014.01)
*H04N 19/61* (2014.01)
*H04N 19/96* (2014.01)
*H04N 19/50* (2014.01)
*H04N 19/176* (2014.01)
*H04N 19/119* (2014.01)
*H04N 19/136* (2014.01)

(52) U.S. Cl.
CPC ............ *H04N 19/129* (2014.11); *H04N 19/13* (2014.11); *H04N 19/136* (2014.11); *H04N 19/176* (2014.11); *H04N 19/18* (2014.11); *H04N 19/50* (2014.11); *H04N 19/61* (2014.11); *H04N 19/96* (2014.11)

(58) Field of Classification Search
CPC .... H04N 19/136; H04N 19/176; H04N 19/18; H04N 19/50; H04N 19/61; H04N 19/96
See application file for complete search history.

(56) References Cited

U.S. PATENT DOCUMENTS

| | | | | |
|---|---|---|---|---|
| 9,432,663 | B2* | 8/2016 | Lim | H04N 19/176 |
| 9,538,174 | B2* | 1/2017 | Chiu | H04N 19/176 |
| 9,860,558 | B2* | 1/2018 | Zhang | H04N 19/593 |
| 2014/0286403 | A1* | 9/2014 | Nishitani | H04N 19/463 375/240.03 |
| 2014/0348227 | A1* | 11/2014 | Lee | H04N 19/463 375/240.03 |
| 2015/0208094 | A1* | 7/2015 | Lee | H04N 19/96 375/240.2 |
| 2017/0208336 | A1 | 7/2017 | Li et al. | |
| 2018/0063528 | A1* | 3/2018 | An | H04N 19/176 |

OTHER PUBLICATIONS

Han, et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

Chen J., et al., Algorithm Description of Joint Exploration Test Model 2 Joint Video Exploration Team (JVET) of ITU-T SG 16 WP 3 and ISO/IEC JTC 1/SC 29/WG 11, 2nd Meeting: San Diego, Feb. 20-26, 2016, JVET-B1001-v3, 32 Pages.

"Block partitioning structure for next generation video coding," MediaTek Inc., Telecommunication Standardization Sector, COM 16-C 966 R3, Sep. 2015, 8 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.263, "Video Coding for Low Bit Rate Communication", Series H: Audiovisual and Multimedia Systems, Infrastructure of audiovisual services—Coding of moving video, Jan. 2005, 226 pp.

Chen J., et al., Algorithm Description of Joint Exploration Test Model 3, Joint Video Exploration Team (JVET) of ITU-T SG 16 WP 3 and ISO/IEC JTC 1/SC 29/WG 11, 3rd Meeting; Geneva, CH, May 26-Jun. 1, 2016, JVET-C1001_v3, 37 pp.

\* cited by examiner

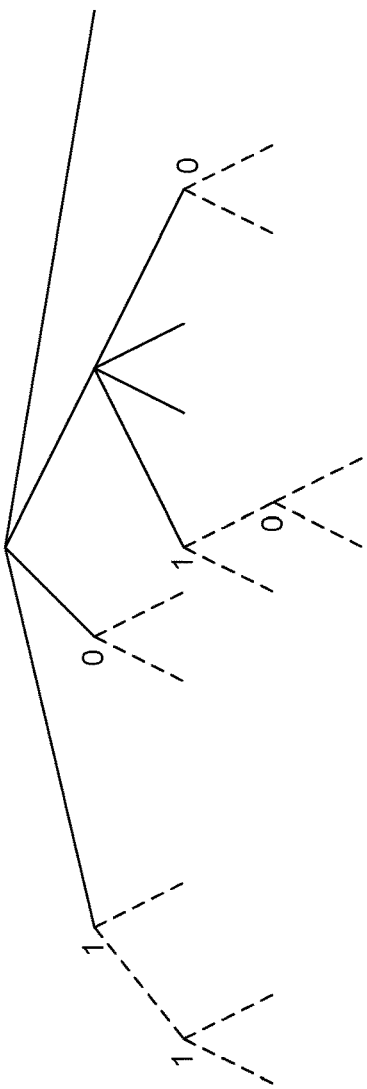
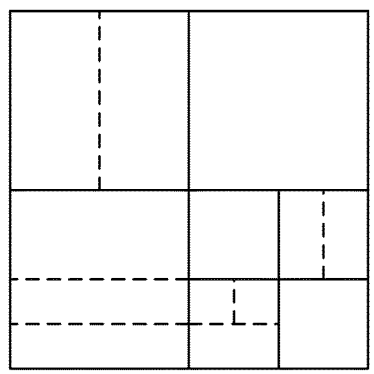
FIG. 4B
FIG. 4A

SIGNALING OF QUANTIZATION INFORMATION IN NON-QUADTREE-ONLY PARTITIONED VIDEO CODING

This application claims the benefit of U.S. Provisional Application No. 62/363,000, filed Jul. 15, 2016, the entire content of which is incorporated by reference.

TECHNICAL FIELD

This disclosure relates to computing devices configured to perform video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to the signaling of quantization information in block-based video coding where blocks are partitioned not only by quadtree structure, but partitioned in other ways. For example, quantization groups may be defined as groups of successive CUs or coding blocks so that boundaries of quantization groups must be boundaries of the CUs or coding blocks and sizes of quantization groups are greater than or equal to a threshold. The techniques may be applied to video coding standards.

In one example, this disclosure describes a method of decoding video data, the method comprising: receiving, by a video decoder, in a bitstream that comprises an encoded representation of the video data, local quantization information for a current quantization group; determining, by the video decoder, a partitioning of a coding tree unit (CTU) of a picture of the video data into a plurality of coding units (CUs), the plurality of CUs including one or more non-square CUs; deriving, by the video decoder, based at least in part on the local quantization information for the current quantization group, a quantization parameter, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; inverse quantizing, by the video decoder, based on the quantization parameter, at least one transform coefficient of a current CU, the current CU being one of the CUs in the current quantization group; and reconstructing, by the video decoder, based on inverse quantized transform coefficients of the current CU, a coding block of the current CU.

In another example, this disclosure describes a method of encoding video data, the method comprising: determining, by a video encoder, a partitioning of a coding tree unit (CTU) of a picture of the video data into a plurality of coding units (CUs), the plurality of CUs including one or more non-square CUs; quantizing, by the video encoder, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; signaling, by the video encoder, in a bitstream that comprises an encoded representation of the video data, local quantization information for the current quantization group, wherein the quantization parameter is derivable based at least in part on the local quantization information for the current quantization group; and including, by the video encoder, in the bitstream, one or more syntax elements representing the quantized transform coefficient of the current CU.

In another example, this disclosure describes an apparatus for decoding video data comprising: one or more storage media configured to store the video data; and one or more processors configured to: receive in a bitstream that comprises an encoded representation of the video data, local quantization information for a current quantization group; determine a partitioning of a coding tree unit (CTU) of a picture of the video data into a plurality of coding units (CUs), the plurality of CUs including one or more non-square CUs; derive, based at least in part on the local quantization information for the current quantization group, a quantization parameter, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; inverse quantize, based on the quantization parameter, at least one transform coefficient of a current CU, the current CU being one of the CUs in the current quantization group; and reconstruct, based on inverse quantized transform coefficients of the current CU, a coding block of the current CU.

In another example, this disclosure describes an apparatus for encoding video data, the apparatus comprising: one or more storage media configured to store the video data; and one or more processors configured to: determine a partitioning of a coding tree unit (CTU) of a picture of the video data into a plurality of coding units (CUs), the plurality of CUs including one or more non-square CUs; quantize, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; signal, in a bitstream that comprises an encoded representation of the video data, local quantization information for the current quantization group, wherein the quantization parameter is derivable based at least in part on the local quantization information for the current quantization group; and include, in the bitstream, one or more syntax elements representing the quantized transform coefficient of the current CU.

In another example, this disclosure describes an apparatus for decoding video data, the apparatus comprising: means for receiving, in a bitstream that comprises an encoded representation of the video data, local quantization information for a current quantization group; means for determining a partitioning of a coding tree unit (CTU) of a picture of the video data into a plurality of coding units (CUs), the plurality of CUs including one or more non-square CUs; means for deriving, based at least in part on the local quantization information for the current quantization group, a quantization parameter, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; means for inverse quantizing, based on the quantization parameter, at least one transform coefficient of a current CU, the current CU being one of the CUs in the current quantization group; and means for reconstructing, based on inverse quantized transform coefficients of the current CU, a coding block of the current CU.

In another example, this disclosure describes an apparatus for encoding video data, the apparatus comprising: means for determining a partitioning of a coding tree unit (CTU) of a picture of the video data into a plurality of coding units (CUs), the plurality of CUs including one or more non-square CUs; means for quantizing, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; means for signaling, in a bitstream that comprises an encoded representation of the video data, local quantization information for the current quantization group, wherein the quantization parameter is derivable based at least in part on the local quantization information for the current quantization group; and means for including, in the bitstream, one or more syntax elements representing the quantized transform coefficient of the current CU.

In another example, this disclosure describes a computer-readable storage medium storing instructions that, when executed, cause one or more processors to: receive, in a bitstream that comprises an encoded representation of the video data, local quantization information for a current quantization group; determine a partitioning of a coding tree unit (CTU) of a picture of the video data into a plurality of coding units (CUs), the plurality of CUs including one or more non-square CUs; derive, based at least in part on the local quantization information for the current quantization group, a quantization parameter, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; inverse quantize, based on the quantization parameter, at least one transform coefficient of a current CU, the current CU being one of the CUs in the current quantization group; and reconstruct, based on inverse quantized transform coefficients of the current CU, a coding block of the current CU.

In another example, this disclosure describes a computer-readable storage medium storing instructions that, when executed, cause one or more processors to: determine, a partitioning of a coding tree unit (CTU) of a picture of the video data into a plurality of coding units (CUs), the plurality of CUs including one or more non-square CUs; quantize, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group; signal, in a bitstream that comprises an encoded representation of the video data, local quantization information for the current quantization group, wherein the quantization parameter is derivable based at least in part on the local quantization information for the current quantization group; and include, in the bitstream, one or more syntax elements representing the quantized transform coefficient of the current CU.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 4A illustrates an example of block partitioning by using Quad-Tree-Binary-Tree partitioning structure.

FIG. 4B illustrates an example tree structure corresponding to the block partitioning of FIG. 4A.

DETAILED DESCRIPTION

Figure 1:
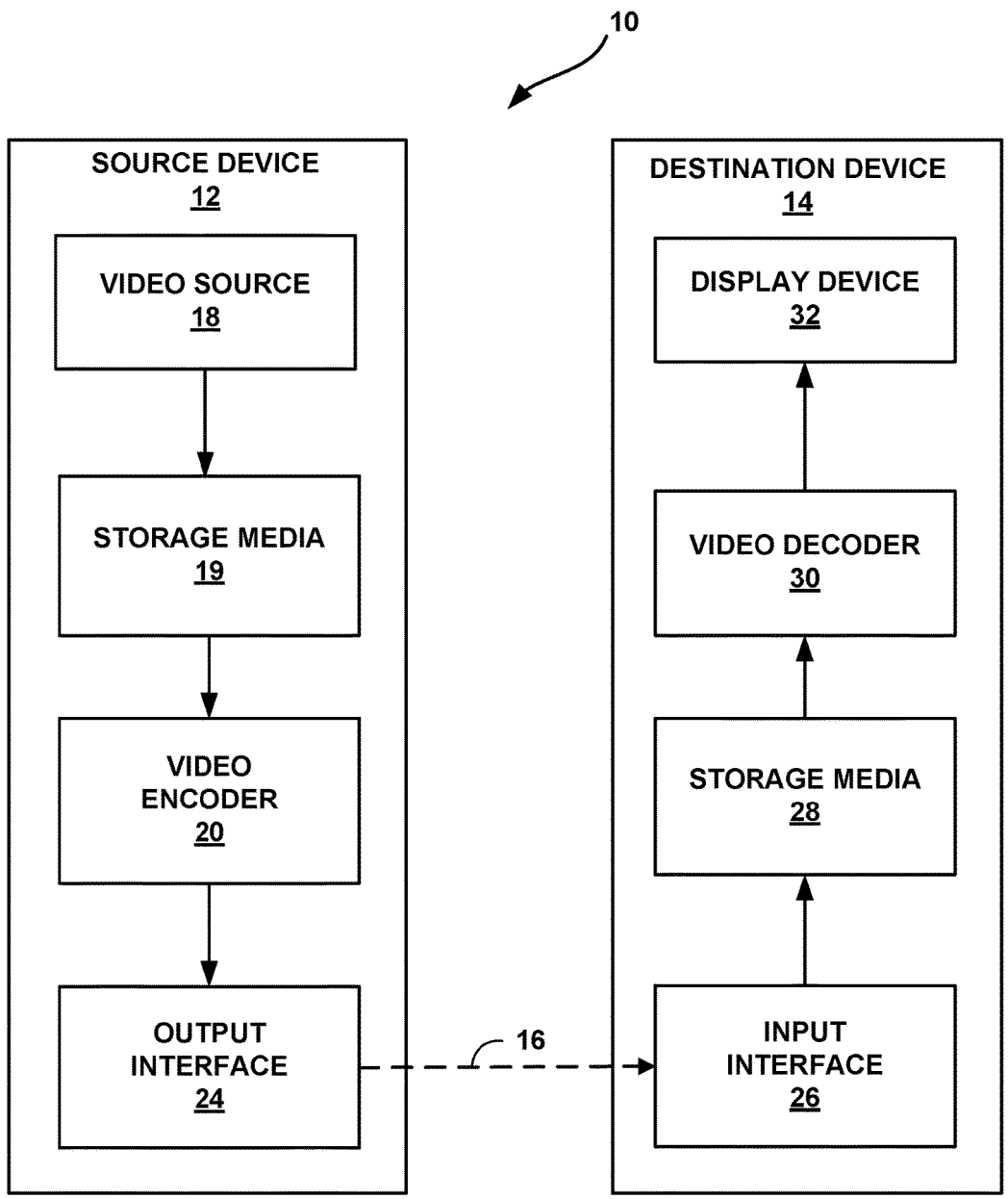
FIG. 1 is a block diagram illustrating an example video encoding and decoding system that may utilize one or more techniques described in this disclosure.

Quantization generally refers to a process in which transform coefficients are quantized to possibly reduce the amount of data used to represent the transform coefficient levels. A value resulting from quantizing a transform coefficient may be referred to as a quantized transform coefficient or a transform coefficient level. Inverse quantizing a transform coefficient refers to a process of reversing the quantization of the transform coefficient. In some examples, inverse quantizing a transform coefficient comprises multiplying a transform coefficient level by a factor, resulting in the transform coefficient. An inverse quantized transform coefficient may also be referred to as a scaled transform coefficient.

A quantization parameter (QP) is a variable used for quantizing and inverse quantizing coefficients. In High Efficiency Video Coding (HEVC), a picture is partitioned into quantization groups. Each of the quantization groups of the picture has the same size and is square-shaped. None of the quantization groups of the picture overlap. A video coder may determine a QP to use in quantizing or inverse quantizing a transform coefficient of a transform unit (TU) of a coding unit (CU) based on local quantization information for a quantization group that includes the CU. The local quantization information for the quantization group may be signaled in a bitstream.

In HEVC, coding tree units (CTUs) are partitioned into CUs according to a quadtree partitioning scheme. A quadtree is a tree in which a parent node can be split into four child nodes, each of which may become a parent node for another split into four child nodes. Because CTUs are square, the resulting CUs are also square. Furthermore, because the heights and widths of CTUs are each equal to powers of 2, the heights and widths of CUs are each also equal to powers of 2. The heights and widths of the square-shaped quantization groups are also equal to powers of 2.

Recent studies have suggested that significantly greater compression performance can be achieved using CTU partitioning schemes other than the quadtree partitioning scheme, such as quad-tree-binary tree (QTBT) and multi-type-tree (MTT) partitioning schemes. The QTBT and MTT partitioning schemes allow a CTU to be partitioned into non-square CUs, such as 8×64 CUs, 32×64 CUs, and so on. Because of the non-square CU shapes allowed by the QTBT and MTT partitioning schemes, the boundaries of CUs in a CTU are not necessarily boundaries of quantization groups. Consequently, the use of the QTBT and MTT partitioning schemes may disrupt the quantization group scheme used in HEVC. For example, two non-square CUs may be forced to share local quantization information for a single quantization group, despite both of the non-square CUs being larger than the size of the quantization group. This disruption may prevent a video encoder from efficiency signaling quantization parameter information used for quantizing transform coefficients. This may offset some of the improvements to compression performance that are potentially achieved using CTU partitioning schemes other than the quadtree partitioning scheme.

Techniques of this disclosure may overcome these challenges, potentially resulting in improvements to computing devices. For instance, the techniques of this disclosure may improve compression, which may increase the capabilities of computing devices to quickly display video, may increase the resolution with which computing devices may display video, may allow computing devices to allocate storage space to other uses, and may provide other improvements. In one example technique of this disclosure, a video coder (e.g., a video encoder or a video decoder) may determine a partitioning of a CTU of a picture of the video data into a plurality of CUs. For instance, the video coder may determine how to partition the CTU into CUs according to a QTBT or MTT. The plurality of CUs may include one or more non-square CUs. Furthermore, the video coder may derive, based at least in part on local quantization information for a current quantization group, a quantization parameter. In accordance with the techniques of this disclosure, the current quantization group is defined as a group of successive, in coding order, CUs in the plurality of CUs or coding blocks in the CTU so that boundaries of the current quantization group must be boundaries of the CUs or coding blocks and a size of the current quantization group is greater than or equal to a threshold. In some examples, at least one CU of the plurality of CUs is included in a non-square quantization group. For instance, in some examples, the current quantization group is not square. The video coder may quantize or inverse quantize, based on the quantization parameter, at least one transform coefficient of a current CU. In this example, the current CU is one of the CUs in the current quantization group or the current CU corresponds to one of the coding blocks in the current quantization group. In this example, the local quantization information for the current quantization group may be signaled in a bitstream that comprises an encoded representation of the video data.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 may be equipped for wireless communication. Thus, source device 12 and destination device 14 may be wireless communication devices. Source device 12 is an example video encoding device (i.e., a device/apparatus for encoding video data). Destination device 14 is an example video decoding device (i.e., a device/apparatus for decoding video data).

In the example of FIG. 1, source device 12 includes a video source 18, storage media 19 configured to store video data, a video encoder 20, and an output interface 24. Destination device 14 includes an input interface 26, storage media 28 configured to store encoded and/or decoded video data, a video decoder 30, and a display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device (not shown). Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each are implemented as any of a variety of suitable programmable and/or fixed-function circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T Series H: Audiovisual and Multimedia Systems, Infrastructure of audiovisual services—Coding of moving video, High Efficiency Video Coding, ITU-T H.265 (04/2015), including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. So is a two-dimensional array of Cb chroma samples. $S_{Cr}$ is a two-dimensional array of Cr chroma samples. In other instances, a picture may be monochrome and may only include an array of luma samples.

To generate an encoded representation of a picture, video encoder 20 may encode blocks of a picture of the video data. Video encoder 20 may include, in a bitstream, an encoded representation of the video block. For example, in HEVC, to generate an encoded representation of a picture, video encoder 20 may generate a set of coding tree units (CTUs). Each of the CTUs may comprise one or more coding tree blocks (CTBs) and may comprise syntax structures used to code the samples of the one or more coding tree blocks. For instance, each CTU may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). A syntax structure may be defined as zero or more syntax elements present together in the bitstream in a specified order. The size of a CTB can range from 16×16 to 64×64 in the HEVC main profile (although technically 8×8 CTB sizes can be supported). In HEVC, a slice includes an integer number of CTUs ordered consecutively in a raster scan order.

In HEVC, to generate a coded CTU of a picture, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise one or more coding blocks and syntax structures used to code samples of the one or more coding blocks. For example, a CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. Thus, in HEVC, a CTB may contain a quad-tree, the nodes of which are CUs.

Figure 2:
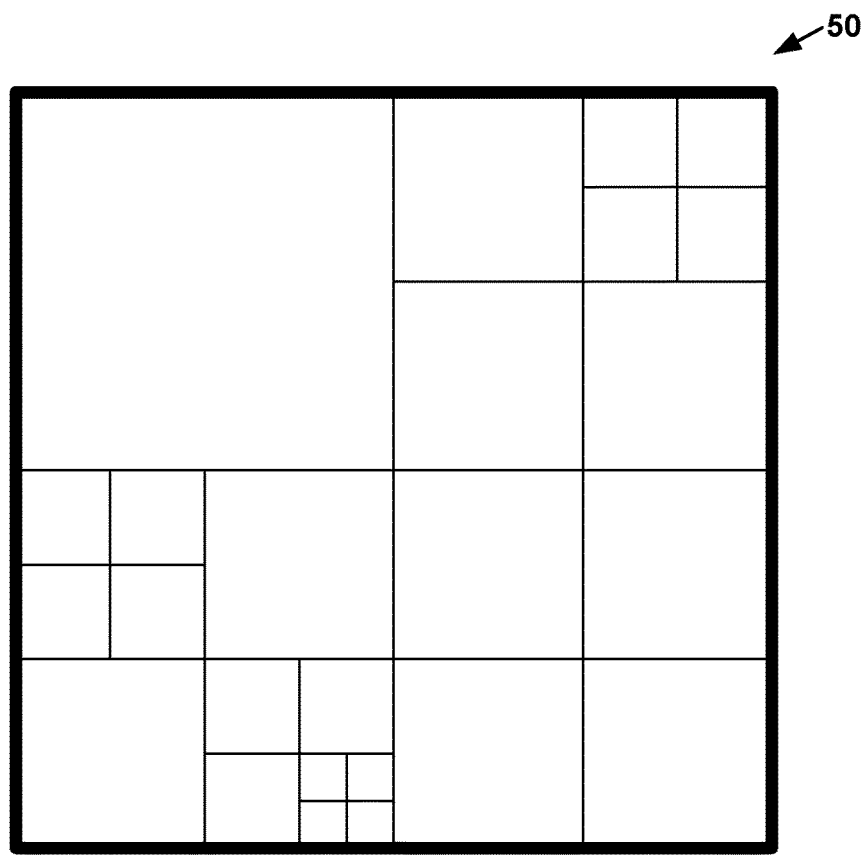
FIG. 2 is a conceptual diagram illustrating an example of a coding unit (CU) structure in High Efficiency Video Coding (HEVC).

FIG. 2 is a conceptual diagram illustrating an example of a CU structure in HEVC. As described in W. J. Han et al., "Improved Video Compression Efficiency Through Flexible Unit Representation and Corresponding Extension of Coding Tools", IEEE Transaction on Circuits and Systems for Video Technology, vol. 20, no. 12, pp. 1709-1720, December 2010, a CTB 50 may be recursively split into CUs in a quad-tree manner, such as shown in FIG. 2. In HEVC, a CU can be the same size of a CTB, although the CU can be as small as 8×8. In the example of FIG. 2, squares with thin lines correspond to CUs.

Furthermore, video encoder 20 may encode a CU. For instance, to encode a CU, video encoder 20 may partition a coding block of a CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Figure 3:
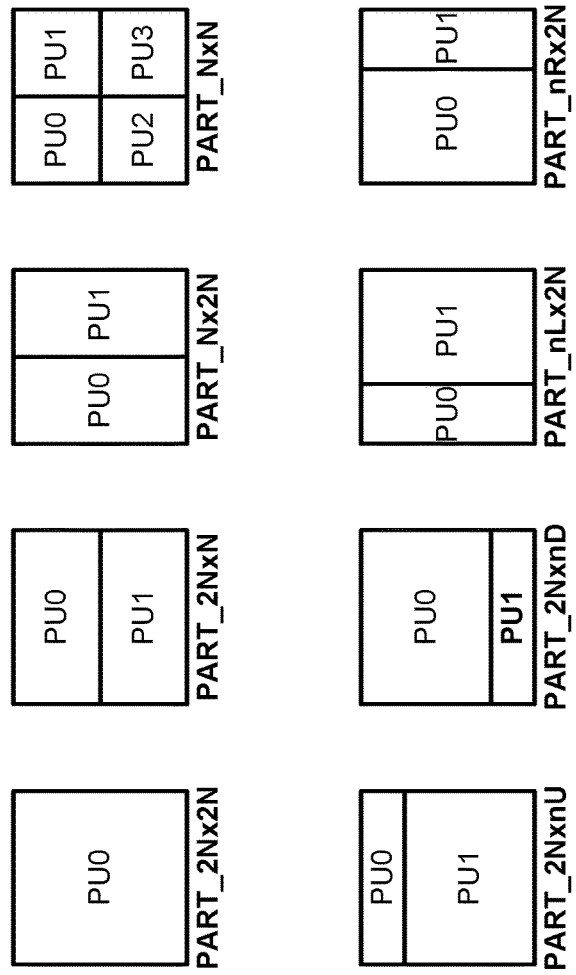
FIG. 3 is a conceptual diagram illustrating example partition modes for inter prediction mode.

In HEVC, each CU is coded with one mode, which could be either intra mode or inter mode. When a CU is inter coded (i.e., inter mode is applied), the CU may be further partitioned into 2 or 4 PUs or become just one PU when further partitioning does not apply. When two PUs are present in one CU, the two PUs can be half size rectangles or two rectangle sizes with ¼ or ¾ size of the CU. FIG. 3 is a conceptual diagram illustrating example partition modes for inter prediction mode. As shown in FIG. 3, there are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N.

When the CU is inter coded, one set of motion information is present for each PU. In addition, each PU is coded with a unique inter-prediction mode to derive the set of motion information. If video encoder 20 uses intra prediction to generate the predictive blocks of a PU, video encoder 20 may generate the predictive blocks of the PU based on decoded samples of the picture that includes the PU. When a CU is intra coded, 2N×2N and N×N are the only permissible PU shapes, and within each PU a single intra prediction mode is coded (while chroma prediction mode is signaled at CU level). The N×N intra PU shapes are only allowed when the current CU size is equal to the smallest CU size defined in a sequence parameter set (SPS).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, in HEVC, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. For example, video encoder 20 may generate a syntax element indicating whether a quantized transform coefficient is greater than 1, a syntax element indicating whether the quantized transform coefficient is greater than 2, a coefficient sign flag for the quantized transform coefficient, and a remainder syntax element. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

In HEVC, quantization groups are used for better control over the signaling granularity of local quantization information. For instance, it may be counterproductive to signal local quantization information for CUs that have sizes below a given threshold. In HEVC, quantization groups are defined as non-overlapped square regions whose size is signaled in a picture parameter set (PPS). For each quantization group, local quantization information is signaled once at most. Thus, the local quantization information of a quantization group may apply to a group of small CUs.

Furthermore, in HEVC, to find the quantization group for a block with coordinates (xCb, yCb) as the top-left luma corner, the following process is defined. The luma location (xQg, yQg), specifies the top-left luma sample of a current quantization group relative to the top-left luma sample of the current picture. The horizontal and vertical positions xQg and yQg are set equal to:

$$xCb-(xCb\&((1<<\text{Log 2MinCuQpDeltaSize})-1)), \text{ and}$$

$$yCb-(yCb\&((1<<\text{Log 2MinCuQpDeltaSize})-1)),$$

respectively, where Log 2MinCuQpDeltaSize indicates the size of quantization group.

In general, the local quantization information for a quantization group may include one or more syntax elements that a video decoder can use to determine a quantization parameter specific to the quantization group. In HEVC, the local quantization information for a quantization group may include a cu_qp_delta_abs syntax element and a cu_qp_delta_sign_flag syntax element. As described in sub-clause 7.4.9.10 of HEVC, the cu_qp_delta_abs_syntax element specifies the absolute value of the difference CuQpDeltaVal between the luma quantization parameter of the current CU and its prediction. The cu_qp_delta_sign_flag specifies the sign of CuQpDeltaVal. CuQpDeltaVal may be referred to as a delta QP. Furthermore, as described in sub-clause 7.4.9.10 of HEVC, CuQpDeltaVal=cu_qp_delta_abs*(1−2*cu_qp_delta_sign_flag). Furthermore, as described in sub-clause 8.6.1 of HEVC, a variable $Qp_Y$ is derived as shown in equation (1), below:

$$Qp_Y=((qP_{Y\_PRED}+CuQpDeltaVal+52+2*QpBdOffset_Y)\%(52+QpBdOffset_Y))-QpBdOffset_Y \quad (1)$$

The luma quantization parameter may then be determined as $Qp'_Y=Qp_Y+QpBdOffset_Y$. As described in sub-clause 7.4.3.2.1 of HEVC, which defines general sequence parameter set RBSP semantics, QpBdOffsety=6*bit_depth_luma_minus8, where bit_depth_luma_minus8 is a syntax element in an SPS and specifies the bit depth of the samples of the luma array $BitDepth_Y$ and the value of the luma quantization parameter range offset QpBdOffset$_Y$. $qP_{Y\_PRED}$ is a predicted quantization parameter whose derivation is described in sub-clause 8.6.1 of HEVC.

As described in sub-clause 8.6.1 of HEVC, the variable $qP_{Y\_PRED}$ is derived as follows by the following ordered steps:

1. The variable $qP_{Y\_PREV}$ is derived as follows:
   If one or more of the following conditions are true, $qP_{Y\_PREV}$ is set equal to SliceQpY:
   The current quantization group is the first quantization group in a slice.
   The current quantization group is the first quantization group in a tile.
   The current quantization group is the first quantization group in a coding tree block row of a tile and entropy_coding_sync_enabled_flag is equal to 1.
   Otherwise, $qP_{Y\_PREV}$ is set equal to the luma quantization parameter QpY of the last coding unit in the previous quantization group in decoding order.

2. The availability derivation process for a block in z-scan order as specified in clause 6.4.1 is invoked with the location (xCurr, yCurr) set equal to (xCb, yCb) and the neighbouring location (xNbY, yNbY) set equal to (xQg−1, yQg) as inputs, and the output is assigned to availableA. The variable qPY_A is derived as follows:
   If one or more of the following conditions are true, qPY_A is set equal to qPY_PREV:
   availableA is equal to FALSE.
   the coding tree block address ctbAddrA of the coding tree block containing the luma coding block covering the luma location (xQg−1, yQg) is not equal to CtbAddrInTs, where ctbAddrA is derived as follows:

$x$Tmp=($x$Qg−1)>>MinTbLog 2SizeY $y$Tmp=$y$Qg>>MinTbLog 2SizeY minTbAddrA=MinTbAddrZs[$x$Tmp][$y$Tmp]
   ctbAddrA=minTbAddrA>>(2*(CtbLog 2SizeY−MinTbLog 2SizeY))  (8-252)

Otherwise, $qP_Y\_A$ is set equal to the luma quantization parameter $Qp_Y$ of the coding unit containing the luma coding block covering (xQg−1, yQg).

3. The availability derivation process for a block in z-scan order as specified in clause 6.4.1 is invoked with the location (xCurr, yCurr) set equal to (xCb, yCb) and the neighbouring location (xNbY, yNbY) set equal to (xQg, yQg−1) as inputs, and the output is assigned to availableB. The variable qPY_B is derived as follows:
   If one or more of the following conditions are true, qPY_B is set equal to qPY_PREV:
   availableB is equal to FALSE.
   the coding tree block address ctbAddrB of the coding tree block containing the luma coding block covering the luma location (xQg, yQg−1) is not equal to CtbAddrInTs, where ctbAddrB is derived as follows:

$x$Tmp=$x$Qg>>MinTbLog 2SizeY $y$Tmp=($y$Qg−1)>>MinTbLog 2SizeY minTbAddrB=MinTbAddrZs[$x$Tmp][$y$Tmp]
   ctbAddrB=minTbAddrB>>(2*(CtbLog 2SizeY−MinTbLog 2SizeY))  (8-253)

Otherwise, qPY_B is set equal to the luma quantization parameter QpY of the coding unit containing the luma coding block covering (xQg, yQg−1).

4. The predicted luma quantization parameter $qP_{Y\_PRED}$ is derived as follows:

$qP_{Y\_PRED}=(qP_{Y\_A}+qP_{Y\_B}+1)>>1$  (8-254)

If a picture is coded using three separate color planes, a video coder may use the process described above for determining the luma quantization parameter to determine quantization parameters for use in quantizing chroma samples. However, if the picture is not coded using three separate color planes, the video coder may instead derive the variables qPCb and qPCr are derived as follows:

$$qPi_{Cb}=Clip3(-QpBdOffset_C 57, Qp_Y+pps\_cb\_qp\_offset+slice\_cb\_qp\_offset+CuQpOffset_{Cb}) \quad (8\text{-}257)$$

$$qPi_{Cr}=Clip3(-QpBdOffset_C, 57, Qp_Y+pps\_cr\_qp\_offset+slice\_cr\_qp\_offset+CuQpOffset_{Cr}) \quad (8\text{-}258)$$

If ChromaArrayType is equal to 1, the variables $qP_{Cb}$ and $qP_{Cr}$ are set equal to the value of $Qp_C$ as specified in Table 8-10 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$$Qp'_{Cb}=qP_{Cb}+QpBdOffset_C \quad (8\text{-}259)$$

$$Qp'_{Cr}=qP_{Cr}+QpBdOffset_C \quad (8\text{-}260)$$

TABLE 8-10

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_c$ | =qPi | 29 | 30 | 31 | 32 | 33 | 33 | 34 | 34 | 35 | 35 | 36 | 36 | 37 | 37 | =qPi-6 |

In the text above, pps_cb_qp_offset and pps_cr_qp_offset are syntax elements signaled in a PPS that specify offsets to the luma quantization parameter (Qp'y) used for deriving the chroma quantization parameters ($Qp'_{Cb}$ and $Qp'_{Cr}$). Slice_cb_qp_offset and slice_cr_qp_offset are syntax elements signaled in slice segment headers indicating differences to be added to the values of pps_cb_qp_offset and pps_cr_qp_offset when determining values of the $Qp'_{cb}$ and $Qp'_{cr}$ values.

Furthermore, in HEVC, the local quantization information for a quantization group may include a cu_chroma_qp_offset_flag syntax element and a cu_chroma_qp_offset_idx syntax element. When present and equal to 1, cu_chroma_qp_offset_flag, specifies that an entry in the cb_qp_offset_list[ ] is used to determine the value of $CuQpOffset_{Cb}$ and a corresponding entry in the cr_qp_offset_list[ ] is used to determine the value of CuQpOffsetCr. cu_chroma_qp_offset_flag equal to 0 specifies that these lists are not used to determine the values of CuQpOffsetCb and CuQpOffsetCr. cu_chroma_qp_offset_idx, when present, specifies the index into the cb_qp_offset_list[ ] and cr_qp_offset_list[ ] that is used to determine the value of $CuQpOffset_{Cb}$ and $CuQpOffset_{Cr}$. When present, the value of cu_chroma_qp_offset_idx shall be in the range of 0 to chroma_qp_offset_list_len_minus1, inclusive. When not present, the value of cu_chroma_qp_offset_idx is inferred to be equal to 0. Sub-clause 7.4.9.10 of HEVC specifies that variables $CuQpOffset_{Cb}$ and $CuQpOffset_{Cr}$ are derived as:

If cu_chroma_qp_offset_flag is equal to 1, the following applies:

$$CuQpOffset_{Cb}=cb\_qp\_offset\_list[cu\_chroma\_qp\_offset\_idx] \quad (7\text{-}74)$$

$$CuQpOffset_{Cr}=cr\_qp\_offset\_list[cu\_chroma\_qp\_offset\_idx] \quad (7\text{-}75)$$

Otherwise (cu_chroma_q_offset_flag is equal to 0), $CuQpOffset_{Cb}$ and $CuQpOffset_{Cr}$ are both set equal to 0.

Sub-clause 8.6.1 of HEVC describes how $CuQpOffset_{Cb}$ and $CuQpOffset_{Cr}$ are used to derive chroma quantization parameters for the Cb and Cr components, $Qp'_{Cb}$ and $Qp'_{Cr}$.

As described in sub-clause 8.6.2 of HEVC, a quantization parameter qP is set to $Qp'_Y$, $Qp'_{Cb}$ or $Qp'_{Cr}$, depending on the color component of the current block being quantized. In some examples, a video encoder may use a quantization parameter to look up a quantization value and a bit shift value. To quantize a transform coefficient, the video encoder may multiply the transform coefficient by the quantization value and right shift the resulting product by the bit shift value. To inverse quantize a transform coefficient, a video decoder may use the quantization parameter to look up the quantization step size. The video decoder may then multiply the transform coefficient by the quantization step size. In sub-clause 8.6.3 of HEVC, the quantization parameter qP is used in a process to inverse quantize transform coefficients. The following text is a copy of sub-clause 8.6.3 of HEVC:

Inputs to this process are:
- a luma location (xTbY, yTbY) specifying the top-left sample of the current luma transform block relative to the top-left luma sample of the current picture,
- a variable nTbS specifying the size of the current transform block,
- a variable cIdx specifying the colour component of the current block,
- a variable qP specifying the quantization parameter.

Output of this process is the (nTbS)×(nTbS) array d of scaled transform coefficients with elements d[x][y].

The variables log 2TransformRange, bdShift, coeffMin and coeffMax are derived as follows:

If cIdx is equal to 0, the following applies:

$$\log 2TransformRange=extended\_precision\_processing\_flag?Max(15, BitDepthY+6):15 \quad (8\text{-}270)$$

$$bdShift=BitDepthY+Log\ 2(nTbS)+10-\log 2TransformRange \quad (8\text{-}271)$$

$$coeffMin=CoeffMinY \quad (8\text{-}272)$$

$$coeffMax=CoeffMaxY \quad (8\text{-}273)$$

Otherwise, the following applies:

$$\log 2TransformRange=extended\_precision\_processing\_flag?Max(15, BitDepthC+6):15 \quad (8\text{-}274)$$

$$bdShift=BitDepthC+Log\ 2(nTbS)+10-\log 2TransformRange \quad (8\text{-}275)$$

$$coeffMin=CoeffMinC \quad (8\text{-}276)$$

$$coeffMax=CoeffMaxC \quad (8\text{-}277)$$

The list levelScale[ ] is specified as levelScale[k]={40, 45, 51, 57, 64, 72} with k=0.5.

For the derivation of the scaled transform coefficients d[x][y] with x=0 . . . nTbS−1, y=0 . . . nTbS−1, the following applies:

The scaling factor m[x][y] is derived as follows:

If one or more of the following conditions are true, m[x][y] is set equal to 16:

scaling_list_enabled_flag is equal to 0.

transform_skip_flag[xTbY][yTbY] is equal to 1 and nTbS is greater than 4.

Otherwise, the following applies:

$$m[x][y]=\text{ScalingFactor}[\text{sizeId}][\text{matrixId}][x][y] \quad (8\text{-}278)$$

Where sizeId is specified in Table 7-3 for the size of the quantization matrix equal to (nTbS)×(nTbS) and matrixId is specified in Table 7-4 for sizeId, CuPredMode[xTbY][yTbY] and cIdx, respectively.

The scaled transform coefficient d[x][y] is derived as follows:

$$d[x][y]=\text{Clip3}(\text{coeffMin, coeffMax, ((TransCoef-fLevel}[xTbY][yTbY][cIdx][x][y]*m[x][y]*\text{level-Scale}[qP\ \%6]<<(qP/6))+(1(bdShift-1)))>>bd-\text{Shift}) \quad (8\text{-}279)$$

Video encoder 20 may output a bitstream that includes encoded video data. For example, the bitstream may comprise a sequence of bits that forms a representation of coded pictures and associated data. Thus, the bitstream comprises an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block. In this disclosure, the term "signaling" may refer to including one or more syntax elements in a bitstream. The term signaling does not necessarily imply any real-time transmission of data.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

J. An et al., "Block partitioning structure for next generation video coding", International Telecommunication Union, COM16-C966, September 2015 (hereinafter, "VCEG proposal COM16-C966") described a quad-tree-binary-tree (QTBT) for a future video coding standard beyond HEVC. Simulations showed the proposed QTBT structure is more efficient than the quad-tree structure used in HEVC.

In the QTBT structure proposed in VCEG proposal COM16-C966, a CTB is firstly partitioned by quad-tree, where the quad-tree splitting of one node can be iterated until the node reaches the minimum allowed quad-tree leaf node size (MinQTSize). If the quad-tree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node is namely CU which will be used for prediction (e.g. intra-picture or inter-picture prediction) and transform without any further partitioning. There are two splitting types, symmetric horizontal splitting and symmetric vertical splitting, in the binary tree splitting.

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quad-tree leaf nodes may have a size from 16×16 (i.e., the MinQTSize) to 128×128 (i.e., the CTU size). If the leaf quad-tree node is 128×128, the leaf quad-tree node will not be further split by the binary tree since the size exceeds the MaxBTSize (i.e., 64×64). Otherwise, the leaf quad-tree node is further partitioned by the binary tree. Therefore, the quad-tree leaf node is also the root node for the binary tree and has the binary tree depth as 0. When the binary tree depth reaches MaxBTDepth (i.e., 4), it implies that no further splitting is performed. When the binary tree node has width equal to MinBTSize (i.e., 4), it implies no further horizontal splitting. Similarly, when the binary tree node has height equal to MinBTSize, it implies no further vertical splitting. The leaf nodes of the binary tree are namely CUs further processed by prediction and transform without any further partitioning.

FIG. 4A and FIG. 4B are conceptual diagrams illustrating quad-tree-binary-tree (QTBT) structures. Particularly, FIG. 4A illustrates an example of block partitioning by using QTBT. FIG. 4B illustrates an example tree structure corresponding to the block partitioning of FIG. 4A. The solid lines in FIG. 4A and FIG. 4B indicate quad-tree splitting and dotted lines in FIG. 4A and FIG. 4B indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quad-tree splitting, there is no need to indicate the splitting type since it always split a block horizontally and vertically into 4 sub-blocks with an equal size.

U.S. Provisional Patent 62/279,233, filed Jan. 15, 2016, and U.S. patent Ser. No. 15/404,634, filed Jan. 12, 2016, proposed a multi-type-tree (MTT) structure. With the MTT structure, a tree node may be further split with multiple tree types, such as binary tree, symmetric center-side tree, and quad-tree. Simulations showed that the multi-type-tree structure may be much more efficient than quad-tree-binary-tree structure.

Figure 5:
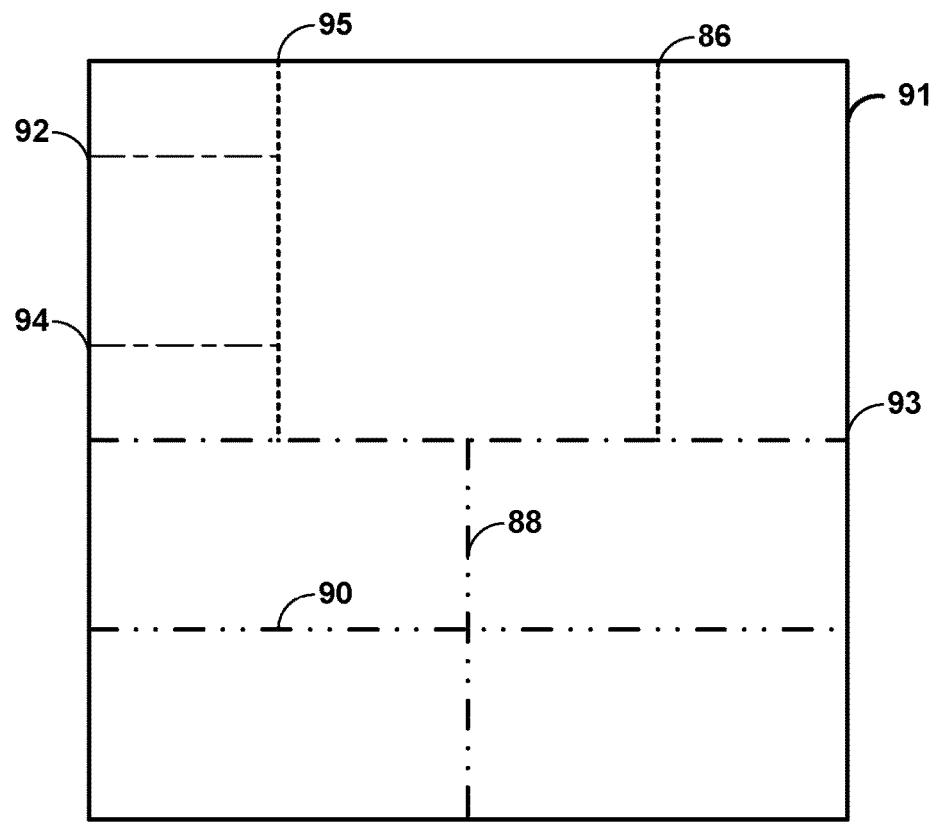
FIG. 5 is a conceptual diagram illustrating an example of coding tree unit (CTU) partitioning using a multi-type-tree (MTT) structure.

FIG. 5 is a conceptual diagram illustrating an example of CTU partitioning using a MTT structure. In other words, FIG. 5 illustrates the partitioning of a CTB 91 corresponding to a CTU. In the example of FIG. 5, At depth 0, CTB 91 (i.e., the whole CTB) is split into two blocks with horizontal binary-tree partitioning (as indicated by line 93 with dashes separated by single dots).

At depth 1:
The upper block is split into three blocks with vertical center-side triple-tree partitioning (as indicated by lines 95 and 86 with small dashes).
The bottom block is split into four blocks with quad-tree partitioning (as indicated by lines 88 and 90 with dashes separated by two dots).

At depth 2:
The left side block of the upper block at depth 1 is split into three blocks with horizontal center-side triple-tree partitioning (as indicated by lines 92 and 94 with long dashes separated by short dashes).
No further split for the center and right blocks of the upper block at depth 1.
No further split for the four blocks of the bottom block at depth 1.

As can be seen in the example of FIG. 5, three different partition structures are used (BT, QT, and TT) with four different partition types (horizontal binary-tree partitioning, vertical center-side triple-tree partitioning, quad-tree partitioning, and horizontal center-side triple-tree partitioning). In both partitioning schemes, such as QTBT and MTT, that are able to partition CTUs into one or more non-square CUs, there may be no distinction between a CU and a TU. In other words, a CU only has one TU, which is the same size as the CU. Thus, in the context of such partitioning schemes, rather than discuss TUs and transform blocks in the context of QTBT and MTT, this disclosure may simply describe transform coefficients of CUs and residual blocks of CUs.

Figure 6:
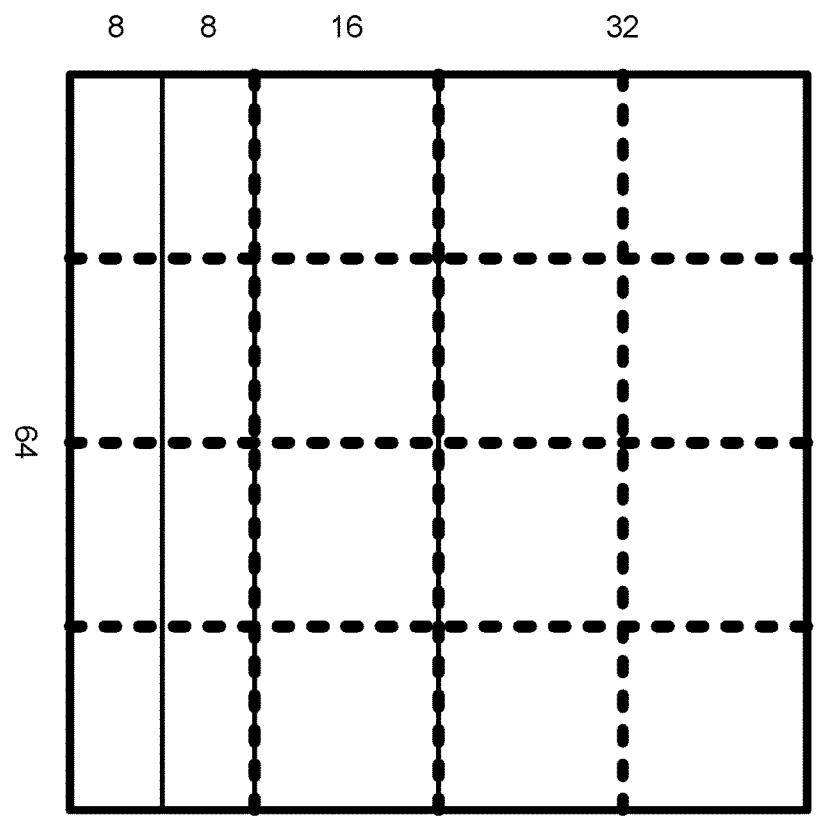
FIG. 6 is a conceptual diagram illustrating an example of partitioning with a binary tree.

In non-quadtree-only partitioned video coding, such as QTBT or MTT, the quantization group defined in HEVC cannot work properly. For instance, FIG. 6 is a conceptual diagram illustrating an example of partitioning with a binary tree. In FIG. 6, blocks outlined in solid black lines indicate that a 64×64 block is partitioned into two 8×64 blocks, one 16×64 block and one 32×64 block with a binary tree. Blocks outlined in dashed lines represent HEVC style quantization groups with the size of 16×16. In some examples, in non-quadtree-only partitioned video coding, a block may be partitioned into two or more sub-blocks (e.g., 2 sub-blocks, 3 sub-blocks, 4 sub-blocks). In some examples, blocks can have different numbers of sub-blocks.

According to the HEVC definition of quantization groups introduced above in this disclosure, the two 8×64 blocks both belong to the first quantization group so that only one set of local quantization information is allowed to be signaled for the two 8×64 blocks even though they are both larger in size than the size of the quantization group. For the first quantization group in the second row (and third, fourth rows) of the quantization groups, no local quantization information can be signaled since it has been signaled as in the 8×64 blocks. Thus, the HEVC-style quantization group does not work properly with binary tree partitioning. For the triple tree introduced in the MTT structure, the problem may become even worse.

The following text describes example techniques that may solve the problems mentioned above. The following examples may be applied individually. Alternatively, any combination of the examples may be applied.

In accordance with an example of this disclosure, a quantization group is redefined as a group of successive (in coding order) CUs or coding blocks so that the boundaries of quantization groups must be the boundaries of CUs or coding blocks. The size of a quantization group is greater than or equal to a threshold (thresholdA), which may be predefined or signaled in the bitstream.

Thus, in accordance with the techniques of this disclosure, video encoder 20 may determine a partitioning of a CTU of a picture of the video data into a plurality of CUs. For example, video encoder 20 may use the QTBT or MTT partitioning schemes as described elsewhere in this disclosure to determining how the CTU is partitioned into CUs. In some examples, the plurality of CUs includes one or more non-square CUs. Furthermore, video encoder 20 may quantize, based on a quantization parameter, at least one transform coefficient of a current CU. In this example, the current CU is in a current quantization group or the current CU corresponds to a coding block in the current quantization group. A CU may correspond to a coding block if the CU comprises the coding block. In accordance with the new definition of a quantization group, the current quantization group of this example is defined as a group of successive, in coding order, CUs or coding blocks so that boundaries of the current quantization group must be boundaries of the CUs or coding blocks and a size of the current quantization group is greater than or equal to a threshold. In this example, the current quantization group may or may not be square. Video encoder 20 may signal, in a bitstream that comprises an encoded representation of the video data, local quantization information for the current quantization group. The quantization parameter is derivable based at least in part on the local quantization information for the current quantization group.

Similarly, video decoder 30 may receive, in a bitstream that comprises an encoded representation of the video data, local quantization information for a current quantization group. Additionally, video decoder 30 may determine a partitioning of a CTU of a picture of the video data into a plurality of CUs. The plurality of CUs may include one or more non-square CUs. Furthermore, video decoder 30 may derive, based at least in part on the local quantization information for the current quantization group, a quantization parameter. For example, the local quantization information for the current quantization group may include a first syntax element (e.g., cu_qp_delta_abs) that indicates an absolute value of a delta QP (e.g., CuQpDeltaVal). The delta QP indicates a difference between a quantization parameter and a predicted quantization parameter. In this example, video decoder 30 may determine a QP as a sum of delta QP and the predicted quantization parameter plus an offset. Consistent with the definition above, the current quantization group is defined as a group of successive, in coding order, CUs or coding blocks so that boundaries of the current quantization group must be boundaries of the CUs or coding blocks and a size of the current quantization group is greater than or equal to a threshold. Like above, the current quantization group may or may not be square. Furthermore, video decoder 30 may inverse quantize, based on the quantization parameter, at least one transform coefficient of a current CU. In this example, the current CU is one of the CUs in the current quantization group or the current CU corresponds to one of the coding blocks in the current quantization group. Video decoder 30 may reconstruct, based on inverse quantized transform coefficients of the current CU, a coding block of the current CU.

Implementing these techniques in a computing device may result in improvements to source device 12 and/or destination device 14. For instance, the techniques of this disclosure may improve compression, which may increase the capability of destination device 14 to quickly display video, may increase the resolution with which destination device 14 may display video, and may provide other improvements. Source device 12 may be improved in that encoded video data may occupy less storage space in memory of source device 12, and may provide destination device 14 with the aforementioned advantages.

In accordance with the redefined quantization group, the size of the quantization group (thresholdA), in terms of the number of luma samples or in terms of the multiples of the smallest size of coding blocks such as 4×4 or 2×2, may be signaled in the bitstream, such as in an SPS, a PPS, a slice header or any other high-level syntax parameter set. For instance, as an efficient way of indicating thresholdA in the bitstream, thresholdA may be expressed as an index, where each value of the index corresponds to a respective multiple of the smallest coding block size (e.g., where 2×2 is the smallest coding block size, 0 corresponds to 2×2, 1 corresponds to 4×4, 2 corresponds to 8×8, and so on). Note that the new definition of quantization group provides that the size of the quantization group is greater than or equal to thresholdA. Because the quantization group may be larger than thresholdA, the quantization group does not need to be square. The shape of a quantization group refers to the outline of group of CUs included in the quantization group.

Thus, in this way, video encoder 20 may signal, in the bitstream, an indication of the threshold (thresholdA). For instance, video encoder 20 may include a syntax element indicating the threshold in the bitstream. In some examples, video encoder 20 signals the threshold in terms of multiples of a smallest size of the coding blocks. Furthermore, in some examples, video encoder 20 may signal, in the bitstream, the indication of the threshold in a SPS, a PPS, a slice header, or another high-level syntax parameter set. In other examples, the threshold is predefined, such that the threshold is available to video decoder 30 without video encoder 20 signaling the threshold. Similarly, video decoder 30 may obtain, from the bitstream, an indication of the threshold. For instance, video decoder 30 may obtain, from the bitstream, the threshold in terms of multiples of a smallest size of the coding blocks. In some examples, video decoder 30 may obtain the indication of the threshold from a SPS, a PPS, a slice header, or another high-level syntax parameter set.

In some examples, if the accumulated size of CUs/blocks (including the current one) within the current quantization group is greater than or equal to the predefined or signaled threshold (thresholdA), a new quantization group is started with the next CU/block in coding order. Thus, video encoder 20 and video decoder 30 may determine, based on an accumulated size of CUs or coding blocks in the current quantization group being greater than or equal to the threshold, that a next quantization group of the plurality of quantization groups starts with a next CU or coding block of the CTU.

In one specific example, if thresholdA is 16×16, thresholdA may correspond to 256 samples. In this example, a CTU may be partitioned into a first CU, a second CU, a third CU, and a fourth CU. Furthermore, in this example, the first CU may include 64 samples, the second CU may include 128 samples, the third CU may include 128 samples, and the fourth CU may include 64 samples. In this example, when determining which of the CUs are included in a first quantization group, a video coder may include the first CU in the first quantization group because the accumulated size (64 samples) is less than thresholdA (256 samples), may include the second CU in the first quantization group because the accumulated size (192) is less than thresholdA (256 samples), and may include the third CU in the first quantization group because the accumulated size (320 samples) is now greater than thresholdA (256 samples). In this example, the video coder does not include the fourth CU in the first quantization group because the accumulated size of the first quantization group, after adding in the third CU, is greater than thresholdA. Hence, the fourth CU may be in a second quantization group.

Furthermore, in some examples, a new quantization group starts for a new CTU. In other words, no quantization group spans two CTUs. Starting a new quantization group for each new CTU may reduce complexity because a video coder may not need to retain local quantization information across CTU boundaries. Thus, video encoder 20 and video decoder 30 may start a new quantization group for each CTU of a picture. Local quantization information may be signaled for each new quantization group.

In some examples, a new quantization group starts for a CU/block with size greater than or equal to a threshold (thresholdB), even when the accumulated size of coding units/blocks (not including the current one) is smaller than the size of quantization group (thresholdA). Thus, in this example, a video coder (e.g., video encoder 20 or video decoder 30) may start a new quantization group for each CU or coding block of the CTU with size greater than or equal to a second threshold, even when an accumulated size of the current quantization group is not greater than the first threshold.

In one specific example, consider a CTU that includes a first CU of size 8×16, a second CU of size 8×16, a third CU of size 32×16, and other CUs. In this example, let thresholdA be 64×64 (i.e., 4096 samples) and let thresholdB be 16×16 (256 samples). Thus, in this example, a video coder does not include the third CU in a first quantization group even though the accumulated size of the first quantization group after the first CU and the second CU is only 256 because the size of the third CU (512 samples) is greater than threshold (256 samples).

The value of thresholdB may be set equal to the value of thresholdA, or the value of thresholdB may be separately pre-defined or signaled in the bitstream. Thus, in some examples, the first threshold (i.e., thresholdA) and the second threshold (i.e., thresholdB) have the same value. In some examples, video encoder 20 may signal, in the bitstream, an indication of a value of the second threshold. Likewise, video decoder 30 may obtain, from the bitstream, an indication of a value of the second threshold.

In some examples, for each quantization group, at most one set of local quantization information is signaled in the bitstream when non-zero quantized coefficients exist within the quantization group. Thus, in such examples, for each respective quantization group of a plurality of quantization groups in a picture, when the respective quantization group contains non-zero quantized coefficients, at most one set of local quantization information is permitted to be signaled in the bitstream for the respective quantization group. In other words, if none of the CUs in a quantization group includes a non-zero quantized coefficient, local quantization information is not signaled for the quantization group. However, if any CU in a quantization group includes a non-zero quantized coefficient, only one set of local quantization information is signaled for the quantization group.

In other examples, for each quantization group, multiple sets of local quantization information may be signaled in the bitstream. A new set of local quantization information is signaled when the current coding block is larger than a threshold which may be predefined or signaled in the bitstream. In some examples, the threshold may be set to the size of the quantization group. In such examples, there is at most two sets of local quantization information for each quantization group.

Thus, in this example, based on a current quantization group including a CU or coding block having a size greater than a second threshold, video encoder 20 may signal, in the bitstream, a second set of local quantization information for the current quantization group. Furthermore, video encoder 20 may derive, based at least in part on the second set of local quantization information for the current quantization group, a second quantization parameter. Additionally, video encoder 20 may quantize, based on the second quantization parameter, at least one transform coefficient of the second CU. In some examples, video encoder 20 may signal, in the bitstream, an indication of a value of the second threshold. In some examples, the second threshold is predefined. Furthermore, in some examples, video encoder 20 may set the second threshold equal to the first threshold.

Similarly, based on the current quantization group including a CU or coding block having a size greater than a second threshold, video decoder 30 may obtain, from the bitstream, a second set of local quantization information for the current quantization group. In this example, video decoder 30 may derive, based at least in part on the second set of local quantization information for the current quantization group, a second quantization parameter. In this example, video decoder 30 may inverse quantize, based on the second quantization parameter, at least one transform coefficient of the second CU. In some examples, video decoder 30 may obtain, from the bitstream, an indication of a value of the second threshold. In some examples, the second threshold is predefined. Furthermore, in some examples, video decoder 30 may set the second threshold equal to the first threshold. In these examples, video encoder 20 and video decoder 30 may derive the second quantization parameter in the same manner as the first quantization parameter. Furthermore, in these examples, video encoder 20 and video decoder 30 may quantize or inverse quantize the transform coefficient in accordance with the examples provided elsewhere in this disclosure for quantizing and inverse quantizing transform coefficients.

In some examples, video encoder 20 may perform particular techniques of this disclosure. For example, for at least one respective quantization group of a plurality of quantization groups within a CTB of a CTU of a picture of the video data, video encoder 20 may derive, based at least in part on local quantization information signaled in the bitstream, a respective quantization parameter for the respective quantization group. Additionally, in this example, video encoder 20 may quantize (or inverse quantize in a reconstruction loop), based on the respective quantization parameter for the respective quantization group, at least one transform coefficient of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video encoder 20 may signal, in a bitstream, the local quantization information.

Furthermore, in some examples, video decoder 30 may perform particular techniques of this disclosure. For example, for at least one respective quantization group of a plurality of quantization groups within a CTB of a CTU of a picture of the video data, video decoder 30 may derive, based at least in part on local quantization information signaled in the bitstream, a respective quantization parameter for the respective quantization group. Additionally, in this example, video decoder 30 may inverse quantize, based on the respective quantization parameter for the respective quantization group, at least one transform coefficient of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 may reconstruct, based on inverse quantized transform coefficients of the CU, a coding block of the CU. For instance, to reconstruct the coding block of the CU, video decoder 30 may apply an inverse transform to the inverse quantized transform coefficients to obtain residual sample values and add the residual sample values to corresponding samples of predictive blocks to reconstruct sample values of the coding block.

Figure 7:
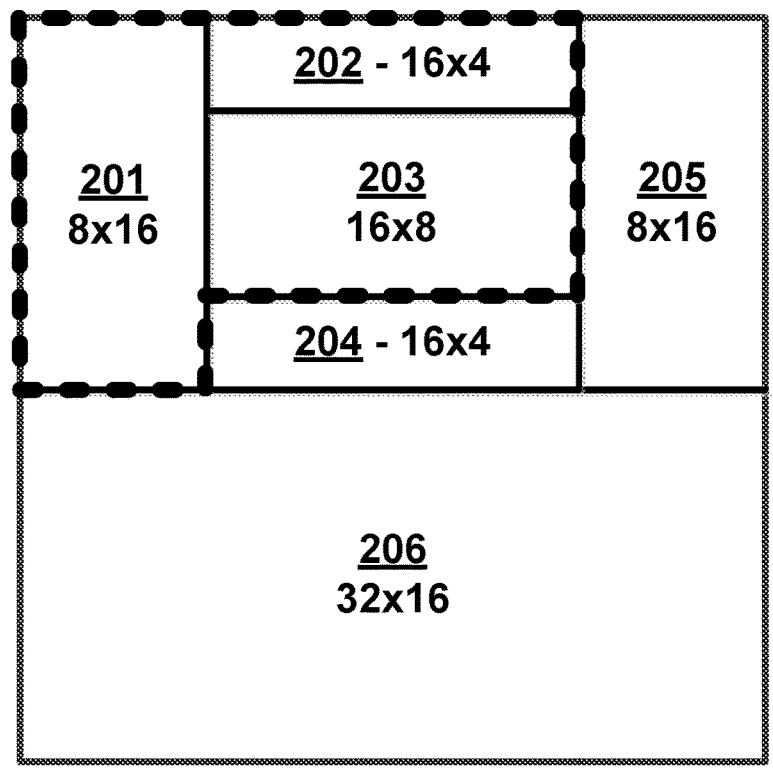
FIG. 7 is a conceptual diagram illustrating quantization groups for a 3×32 block partitioned by a multi-type-tree (MTT) structure.

As indicated above, in some examples, local quantization information may be signaled (e.g., by video encoder 20). FIG. 7 is a conceptual diagram illustrating quantization groups for a 32×32 block partitioned by a multi-type-tree (MTT) structure. The example MTT structure of FIG. 7 shows quantization groups for the blocks 201, 202, 203, 204, 205, and 206. Each of blocks 201, 202, 203, 204, 205, and 206 may correspond to a respective CU. In the example of FIG. 7, the size of a quantization group is defined as 16×16 (i.e., 256 luma samples). Thus, quantization group 1 covers blocks 201-203, and quantization group 2 covers blocks 204-206. In the example of FIG. 7, the dashed line indicates quantization group 1. Note that quantization group 1 is not square. When the size of the quantization groups is set to 16×16 (or 256 luma samples), blocks 201-203 form the first quantization group with an accumulated size of 320 (8×16+ 16×4+16×8). In this case, local quantization information is signaled at most only once for the first quantization group, whenever a block with non-zero coefficients is encountered.

Then, in the example of FIG. 7, the second quantization group starts from block 204 and covers blocks 204-206. It is noted that block 206 itself is larger than the size of quantization group (16×16). But the accumulated size of block 204 and block 205 (16×4+8×16=192) has not reached the threshold. Therefore, the second quantization group covers blocks 204-206. In some examples, the local quantization information for the second quantization group is signaled once at most. In other words, only one set of local quantization information is signaled for the second quantization group.

However, in another example, two sets of local quantization information may be signaled for the second quantization group because there is a large block (i.e., a block whose size exceeds a second threshold) (block 206) in the second quantization group. In this example, if one set of local quantization information has been signaled for block 204, a second set of local quantization information may be signaled for block 206 if block 206 has non-zero coefficients.

In some examples, there are separate luma and chroma coding trees. Thus, the same CTU may be divided into CUs differently for luma and chroma. For example, the CTU may be partitioned into eight luma CUs, each of which only corresponds to a luma coding block. In this example, the same CTU may be partitioned into four chroma CUs, each of which only corresponds to a chroma coding block. Furthermore, as indicated above, the local quantization information for a quantization group may include a first syntax element (e.g., cu_qp_delta_abs) that indicates an absolute value of a delta QP (e.g., CuQpDeltaVal). The delta QP indicates a difference between a quantization parameter and a predicted quantization parameter. Video decoder 30 may determine a QP as a sum of delta QP and the predicted quantization parameter and, in some instances, an offset. Additionally, the local quantization information for a quantization group may include a second syntax element (e.g., cu_qp_delta_sign_flag) that specifies the positive/negative sign of the delta QP. This disclosure may refer to signaling of the first syntax element and the second syntax element as delta QP signaling.

In examples where there are separate luma and chroma coding trees for a CTU, different quantization groups are defined within the CTU for luma and chroma. Accordingly, if separate luma and chroma coding trees are allowed (e.g., as may be the case for I-slices for QTBT), separate delta QP signaling may be performed. Furthermore, in examples where separate luma and chroma coding trees are allowed, separate thresholds and quantization group sizes may be defined for chroma samples.

Alternatively, in some examples, the delta QP for chroma (i.e., the chroma delta QP) may be derived from corresponding luma delta QP. Then, the derived delta QP is added to the predicted chroma QP to derive the actual chroma QP. For calculating predicted chroma QP, the same method as used in calculating the predicted luma QP (e.g., as described above) may be used.

The delta QP for a chroma block may be derived in various ways. For example, the delta QP for the chroma block may be set to the delta QP for the luma sample corresponding to the left top chroma sample of the block. In another example, all of the distinct luma delta QP values corresponding to the samples of the chroma block are averaged to derive the delta QP for the chroma block. In another example, all of the distinct luma delta QP values corresponding to the samples of the chroma block are averaged in a weighted manner to derive the delta QP for the chroma block. The weighting corresponds to the fraction of samples from the chroma block which correspond to each distinct luma delta QP value.

In some examples, instead of applying these strategies to derive chroma delta QP values, chroma QP values may be derived directly from a luma QP. For example, a luma-to-chroma QP lookup table may be used and any chroma QP offsets may be applied.

Figure 8:
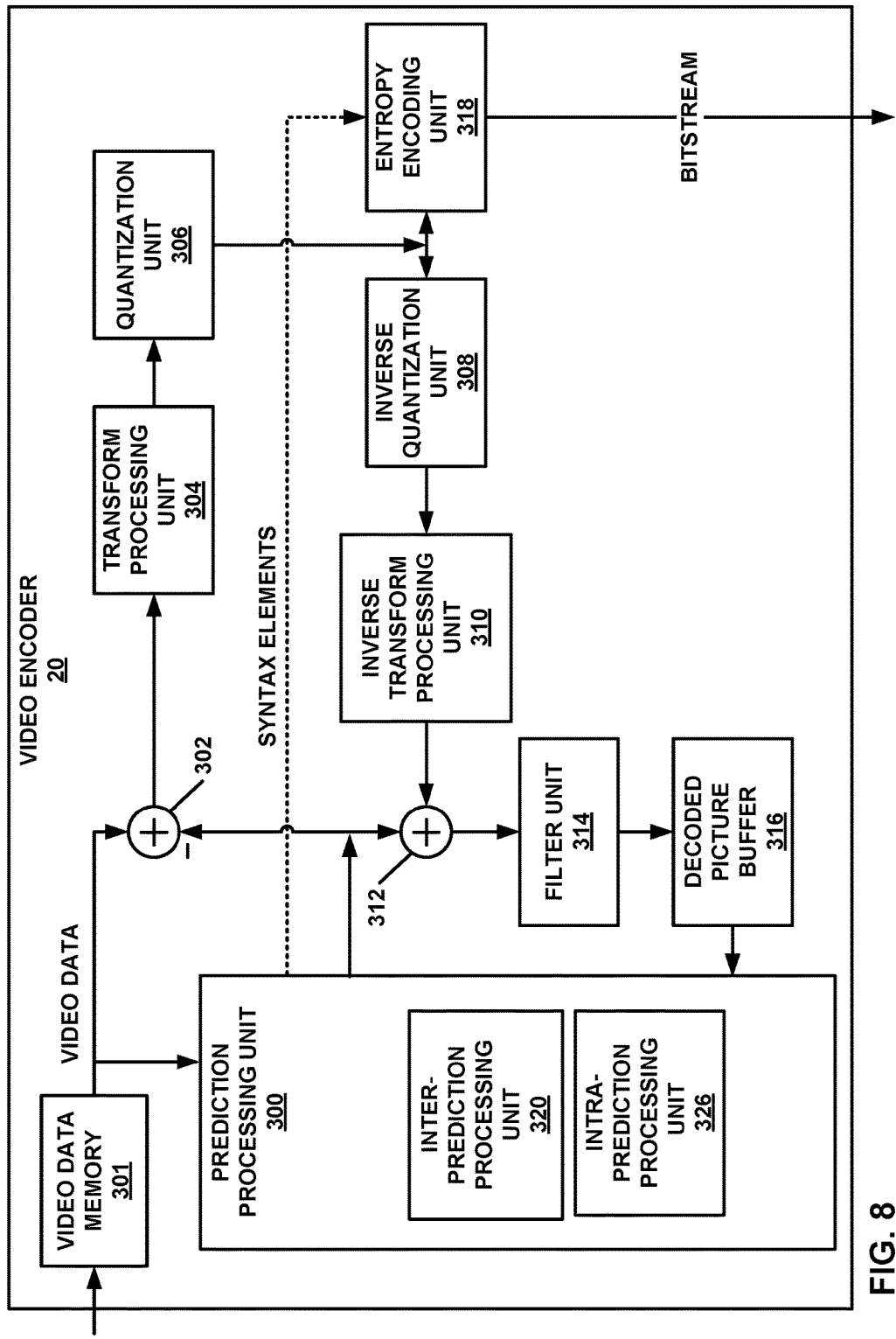
FIG. 8 is a block diagram illustrating an example video encoder that may implement one or more techniques described in this disclosure.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. The techniques of this disclosure may be applicable to various coding standards or methods.

In the example of FIG. 8, video encoder 20 includes a prediction processing unit 300, video data memory 301, a residual generation unit 302, a transform processing unit 304, a quantization unit 306, an inverse quantization unit 308, an inverse transform processing unit 310, a reconstruction unit 312, a filter unit 314, a decoded picture buffer 316, and an entropy encoding unit 318. Prediction processing unit 300 includes an inter-prediction processing unit 320 and an intra-prediction processing unit 326. Inter-prediction processing unit 320 may include a motion estimation unit and a motion compensation unit (not shown).

Video data memory 301 may be configured to store video data to be encoded by the components of video encoder 20. The video data stored in video data memory 301 may be obtained, for example, from video source 18 (FIG. 1). Decoded picture buffer 316 may be a reference picture memory that stores reference video data for use in encoding video data by video encoder 20, e.g., in intra- or inter-coding modes. Video data memory 301 and decoded picture buffer 316 may be formed by any of a variety of memory devices, such as dynamic random access memory (DRAM), including synchronous DRAM (SDRAM), magnetoresistive RAM (MRAIVI), resistive RAM (RRAM), or other types of memory devices. Video data memory 301 and decoded picture buffer 316 may be provided by the same memory device or separate memory devices. In various examples, video data memory 301 may be on-chip with other components of video encoder 20, or off-chip relative to those components. Video data memory 301 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 300 may perform partitioning to divide the CTBs of the CTU into progressively-smaller blocks. The smaller blocks may be coding blocks of CUs. For example, prediction processing unit 300 may partition a CTB associated with a CTU according to a tree structure, such as a QTBT or MTT.

Video encoder 20 may encode CUs of a CTU to generate encoded representations of the CUs (i.e., coded CUs). As part of encoding a CU, prediction processing unit 300 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 320 may generate predictive data for a PU by performing inter prediction on each PU of a CU. The predictive data for the PU may include predictive blocks of the PU and motion information for the PU. Inter-prediction processing unit 320 may perform different operations for a PU of a CU depending on whether the PU is in an I slice, a P slice, or a B slice. In an I slice, all PUs are intra predicted. Hence, if the PU is in an I slice, inter-prediction processing unit 320 does not perform inter prediction on the PU. Thus, for blocks encoded in I-mode, the predicted block is formed using spatial prediction from previously-encoded neighboring blocks within the same frame. If a PU is in a P slice, inter-prediction processing unit 320 may use uni-directional inter prediction to generate a predictive block of the PU. If a PU is in a B slice, inter-prediction processing unit 320 may use uni-directional or bi-directional inter prediction to generate a predictive block of the PU.

Intra-prediction processing unit 326 may generate predictive data for a PU by performing intra prediction on the PU. The predictive data for the PU may include predictive blocks of the PU and various syntax elements. Intra-prediction processing unit 326 may perform intra prediction on PUs in I slices, P slices, and B slices.

To perform intra prediction on a PU, intra-prediction processing unit 326 may use multiple intra prediction modes to generate multiple sets of predictive data for the PU. Intra-prediction processing unit 326 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 326 may use various numbers of intra prediction modes, e.g., 33 directional intra prediction modes. In some examples, the number of intra prediction modes may depend on the size of the region associated with the PU.

Prediction processing unit 300 may select the predictive data for PUs of a CU from among the predictive data generated by inter-prediction processing unit 320 for the PUs or the predictive data generated by intra-prediction processing unit 326 for the PUs. In some examples, prediction processing unit 300 selects the predictive data for the PUs of the CU based on rate/distortion metrics of the sets of predictive data. The predictive blocks of the selected predictive data may be referred to herein as the selected predictive blocks.

Residual generation unit 302 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 302 may generate the residual blocks of the CU such that each sample in the residual blocks has a value equal to a difference between a sample in a coding block of the CU and a corresponding sample in a corresponding selected predictive block of a PU of the CU.

In some examples, transform processing unit 304 may perform partitioning (e.g., quad-tree partitioning) to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT. In some examples, no partitioning of the CU occurs and a TU may correspond to the full size of the CU. In some examples where the CTU is partitioned into CUs using a partitioning scheme that is able to partition the CTU into non-square CUs, transform processing unit 304 does not partition residual blocks of a CU. Rather, the TUs of such CUs may be coterminous with the CUs.

Transform processing unit 304 may generate transform coefficient blocks for each TU of a CU by applying one or more transforms to the transform blocks of the TU. Transform processing unit 304 may apply various transforms to a transform block associated with a TU. For example, transform processing unit 304 may apply a discrete cosine transform (DCT), a directional transform, or a conceptually similar transform to a transform block. In some examples, transform processing unit 304 does not apply transforms to a transform block. In such examples, the transform block may be treated as a transform coefficient block.

Quantization unit 306 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 306 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

In some examples, quantization unit 306 implements techniques of this disclosure. For example, quantization unit 306 may quantize, based on a respective quantization parameter, at least one transform coefficient of a CU of the CTU. In this example, the CU is in a current quantization group, where the current quantization group is defined as a group of successive, in coding order, CUs or coding blocks so that boundaries of the respective quantization group must be boundaries of the CUs or coding blocks and a size of the respective quantization group is greater than or equal to a threshold. Video encoder 20 may signal, in a bitstream, the local quantization information for the current quantization group.

Inverse quantization unit 308 and inverse transform processing unit 310 may apply inverse quantization and inverse transforms to a coefficient block, respectively, to reconstruct a residual block from the coefficient block. Reconstruction unit 312 may add the reconstructed residual block to corresponding samples from one or more predictive blocks generated by prediction processing unit 300 to produce reconstructed coding blocks of the CU.

Inverse quantization unit 308 may perform particular techniques of this disclosure. For example, for at least one respective quantization group of a plurality of quantization groups within a CTB of a CTU of a picture of the video data, inverse quantization unit 308 may derive, based at least in part on local quantization information signaled in the bitstream, a respective quantization parameter for the respective quantization group. Additionally, in this example, inverse quantization unit 308 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video encoder 20 (e.g., inverse transform processing unit 310, reconstruction unit 312, and filter unit 314) may reconstruct, based on inverse quantized transform coefficients of the transform block, a coding block of the CU.

Filter unit 314 may perform one or more deblocking operations to reduce blocking artifacts in the coding blocks associated with a CU. Decoded picture buffer 316 may store the reconstructed coding blocks after filter unit 314 performs the one or more deblocking operations on the reconstructed coding blocks. Inter-prediction processing unit 320 may use a reference picture that contains the reconstructed coding blocks to perform inter prediction on PUs of other pictures. In addition, intra-prediction processing unit 326 may use reconstructed coding blocks in decoded picture buffer 316 to perform intra prediction on other PUs in the same picture as the CU.

Entropy encoding unit 318 may receive data from other functional components of video encoder 20. For example, entropy encoding unit 318 may receive coefficient blocks from quantization unit 306 and may receive syntax elements from prediction processing unit 300. Entropy encoding unit 318 may perform one or more entropy encoding operations on the data to generate entropy-encoded data. For example, entropy encoding unit 318 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 318. For instance, the bitstream may include data that represents values of transform coefficients for a CU.

Figure 9:
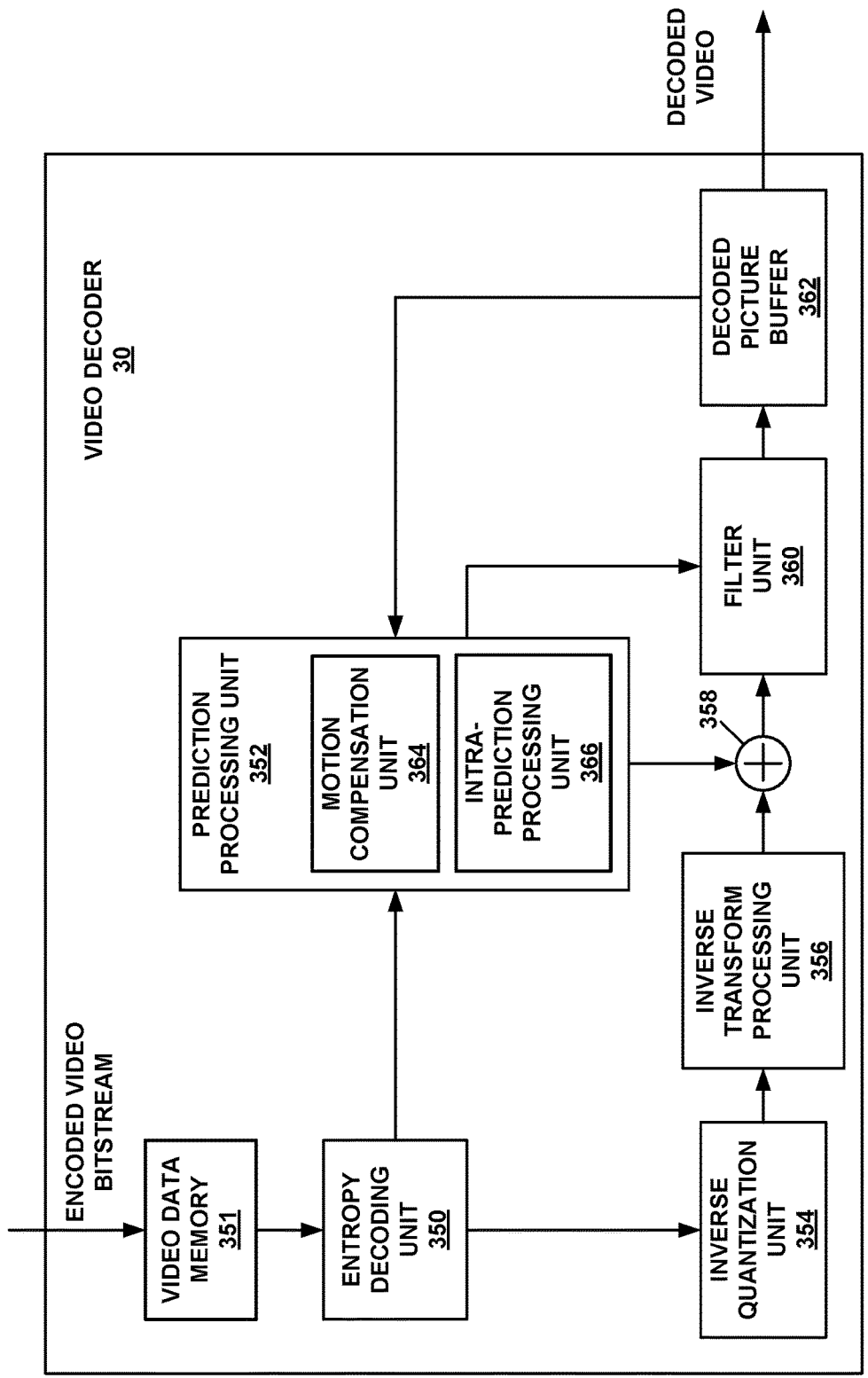
FIG. 9 is a block diagram illustrating an example video decoder that may implement one or more techniques described in this disclosure.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an entropy decoding unit 350, video data memory 351, a prediction processing unit 352, an inverse quantization unit 354, an inverse transform processing unit 356, a reconstruction unit 358, a filter unit 360, and a decoded picture buffer 362. Prediction processing unit 352 includes a motion compensation unit 364 and an intra-prediction processing unit 366. In other examples, video decoder 30 may include more, fewer, or different functional components.

Video data memory 351 may store encoded video data, such as an encoded video bitstream, to be decoded by the components of video decoder 30. The video data stored in video data memory 351 may be obtained, for example, from computer-readable medium 16 (FIG. 1), e.g., from a local video source, such as a camera, via wired or wireless network communication of video data, or by accessing physical data storage media. Video data memory 351 may form a coded picture buffer (CPB) that stores encoded video data from an encoded video bitstream. Decoded picture buffer 362 may be a reference picture memory that stores reference video data for use in decoding video data by video decoder 30, e.g., in intra- or inter-coding modes, or for output. Video data memory 351 and decoded picture buffer 362 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 351 and decoded picture buffer 362 may be provided by the same memory device or separate memory devices. In various examples, video data memory 351 may be on-chip with other components of video decoder 30, or off-chip relative to those components. Video data memory 351 may be the same as or part of storage media 28 of FIG. 1.

Video data memory 351 receives and stores encoded video data (e.g., NAL units) of a bitstream. Entropy decoding unit 350 may receive encoded video data (e.g., NAL units) from video data memory 351 and may parse the NAL units to obtain syntax elements. Entropy decoding unit 350 may entropy decode entropy-encoded syntax elements in the NAL units. Prediction processing unit 352, inverse quantization unit 354, inverse transform processing unit 356, reconstruction unit 358, and filter unit 360 may generate decoded video data based on the syntax elements extracted from the bitstream. Entropy decoding unit 350 may perform a process generally reciprocal to that of entropy encoding unit 318.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 354 may inverse quantize, i.e., de-quantize, coefficient blocks associated with the TU. After inverse quantization unit 354 inverse quantizes a coefficient block, inverse transform processing unit 356 may apply one or more inverse transforms to the coefficient block in order to generate a residual block associated with the TU. For example, inverse transform processing unit 356 may apply an inverse DCT, an inverse integer transform, an inverse Karhunen-Loeve transform (KLT), an inverse rotational transform, an inverse directional transform, or another inverse transform to the coefficient block.

Inverse quantization unit 354 may perform particular techniques of this disclosure. For example, for at least one respective quantization group of a plurality of quantization groups within a CTB of a CTU of a picture of the video data, inverse quantization unit 354 may derive, based at least in part on local quantization information signaled in the bitstream, a respective quantization parameter for the respective quantization group. Additionally, in this example, inverse quantization unit 354 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 356, reconstruction unit 358, and filter unit 360) may reconstruct, based on inverse quantized transform coefficients of the transform block, a coding block of the CU.

If a PU is encoded using intra prediction, intra-prediction processing unit 366 may perform intra prediction to generate predictive blocks of the PU. Intra-prediction processing unit 366 may use an intra prediction mode to generate the predictive blocks of the PU based on samples of spatially-neighboring blocks. Intra-prediction processing unit 366 may determine the intra prediction mode for the PU based on one or more syntax elements obtained from the bitstream.

If a PU is encoded using inter prediction, entropy decoding unit 350 may determine motion information for the PU. Motion compensation unit 364 may determine, based on the motion information of the PU, one or more reference blocks. Motion compensation unit 364 may generate, based on the one or more reference blocks, predictive blocks (e.g., predictive luma, Cb and Cr blocks) for the PU.

Reconstruction unit 358 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 358 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 360 may perform a deblocking operation to reduce blocking artifacts associated with the coding blocks of the CU. Video decoder 30 may store the coding blocks of the CU in decoded picture buffer 362. Decoded picture buffer 362 may provide reference pictures for subsequent motion compensation, intra prediction, and presentation on a display device, such as display device 32 of FIG. 1. For instance, video decoder 30 may perform, based on the blocks in decoded picture buffer 362, intra prediction or inter prediction operations for PUs of other CUs.

Figure 10:
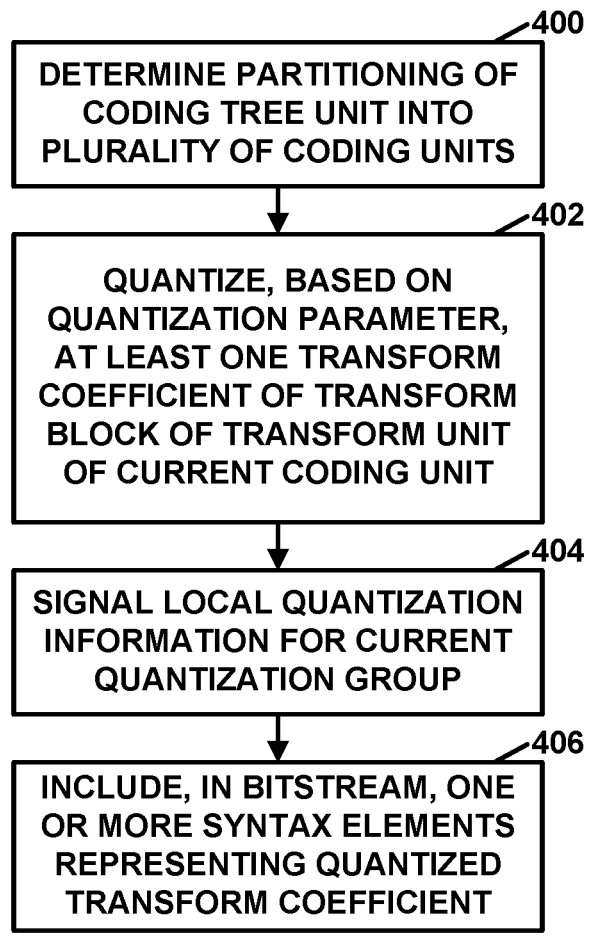
FIG. 10 is a flowchart illustrating an example operation of a video encoder, in accordance with one or more techniques of this disclosure.

FIG. 10 is a flowchart illustrating an example operation of a video encoder, in accordance with one or more techniques of this disclosure. The flowcharts of this disclosure are provided as examples. Other examples may include more, fewer, or different actions. Moreover, actions may be performed in different orders.

In the example of FIG. 10, video encoder 20 may determine a partitioning of a CTU of a picture of the video data into a plurality of CUs (400). The plurality of CUs includes one or more non-square CUs. Video encoder 20 may determine the partitioning of the CTU into the plurality of CUs according to a QTBT partitioning scheme or a MTT partitioning scheme, as described elsewhere in this disclosure. In some examples, video encoder 20 may determine the partitioning of the CTU by testing various possible ways of partitioning the CTU to determine which of the possible ways results in the rate/distortion score.

Video encoder 20 may quantize, based on a quantization parameter, at least one transform coefficient of a current CU (402). The current CU is in a current quantization group or the current CU corresponds to a coding block in the current quantization group. The current quantization group is defined as a group of successive, in coding order, CUs or coding blocks so that boundaries of the current quantization group must be boundaries of the CUs or coding blocks and a size of the current quantization group is greater than or equal to a threshold. For instance, the current quantization may be defined as a group of successive, in coding order, CUs of the plurality of CUs of the CTU so that boundaries of the current quantization group must be boundaries of the CUs or coding blocks and a size of the current quantization group is greater than or equal to a threshold. In some examples, at least one CU of the plurality of CUs is included in a non-square quantization group. For instance, in some examples, the current quantization group is not square.

Furthermore, in the example of FIG. 10, video encoder 20 may signal, in a bitstream that comprises an encoded representation of the video data, the local quantization information for the current quantization group (404). The quantization parameter is derivable based at least in part on the local quantization information for the current quantization group. For example, video encoder 20 may include, in the bitstream, one or more syntax elements that a video decoder can use to determine a quantization parameter specific to the quantization group, such as a cu_qp_delta_abs syntax element and a cu_qp_delta_sign_flag syntax element. An example process of deriving a quantization parameter from the local quantization information of a quantization group is discussed elsewhere in this disclosure. Additionally, video encoder 20 may include, in the bitstream, one or more syntax element representing quantized transform coefficients (406). For example, video encoder 20 may generate a syntax element indicating whether a quantized transform coefficient is greater than 1, a syntax element indicating whether the quantized transform coefficient is greater than 2, a coefficient sign flag for the quantized transform coefficient, and a remainder syntax element. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

Figure 11:
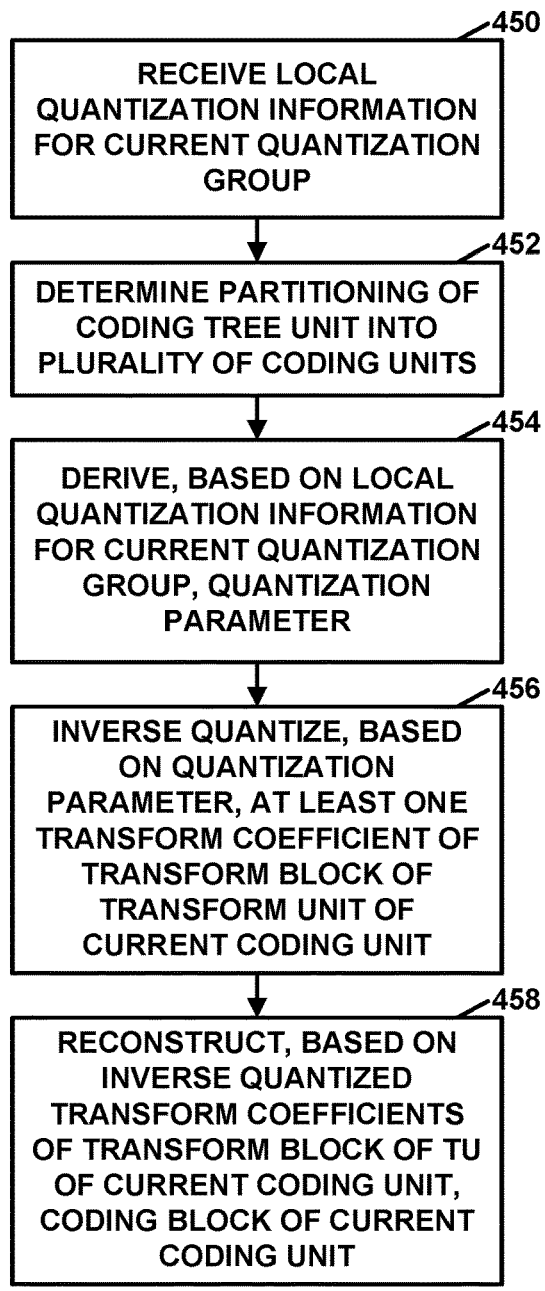
FIG. 11 is a flowchart illustrating an example operation of a video decoder, in accordance with one or more techniques of this disclosure.

FIG. 11 is a flowchart illustrating an example operation of video decoder 30, in accordance with one or more techniques of this disclosure. In the example of FIG. 11, video decoder 30 may receive, from a bitstream that comprises an encoded representation of the video data, local quantization information for a current quantization group (450). For instance, video decoder 30 may parse the bitstream to obtain the local quantization information for the current quantization group. For instance, video encoder 30 may obtain from the bitstream a syntax element indicating an absolute value of a luma or chroma delta QP and a syntax element indicating a sign of the luma or chroma delta QP.

Additionally, video decoder 30 may determine a partitioning of a CTU of a picture of the video data into a plurality of CUs (452). In some examples, the plurality of CUs includes one or more non-square CUs. Video decoder 30 may determine the partitioning of the CTU in various ways. For example, video decoder 30 may determine the partitioning of the CTU into the plurality of CUs according to a QTBT partitioning scheme or a MTT partitioning scheme, as described elsewhere in this disclosure. For instance, video decoder 30 may obtain syntax elements from the bitstream that specify how the CTU is partitioned into CUs. For example, video decoder 30 may obtain one or more split indicator syntax elements that each indicates the number of sub-blocks into which a corresponding block is split.

Furthermore, video decoder 30 may derive, based at least in part on the local quantization information for the current quantization group, a quantization parameter (454). The current quantization group is defined as a group of successive, in coding order, CUs or coding blocks so that boundaries of the current quantization group must be boundaries of the CUs or coding blocks and a size of the current quantization group is greater than or equal to a threshold. For instance, the current quantization group may be defined as a group of successive, in coding order, CUs in the plurality of CUs of the CTU and a size of the current quantization group is greater than or equal to the threshold. In some examples, one or more CUs in the plurality of CUs is included in a non-square quantization group. For instance, in some examples, the current quantization group is not square. In some examples, video decoder 30 may determine the quantization parameter by adding a delta QP to a predicted QP and an offset (e.g., $52+2*\text{QpBdOffset}_Y$). In some examples, video decoder 30 may determine a chroma QP in the manner used in HEVC.

Furthermore, video decoder 30 may inverse quantize, based on the quantization parameter, at least one transform coefficient of a current CU (456). The current CU is one of the CUs in the current quantization group or the current CU corresponding to one of the coding blocks in the current quantization group. In some examples, to inverse quantize a transform coefficient, video decoder 30 may use the process described in § 8.6.3 of HEVC.

Video decoder 30 may reconstruct, based on inverse quantized transform coefficients of the current CU, a coding block of the current CU (458). For instance, as described elsewhere in this disclosure, video decoder 30 may apply an inverse transform to the inverse quantized transform coefficients to generate residual samples. Furthermore, video decoder 30 may add the residual samples to corresponding predictive samples to reconstruct samples of the coding block.

Figures 12A, 12B:
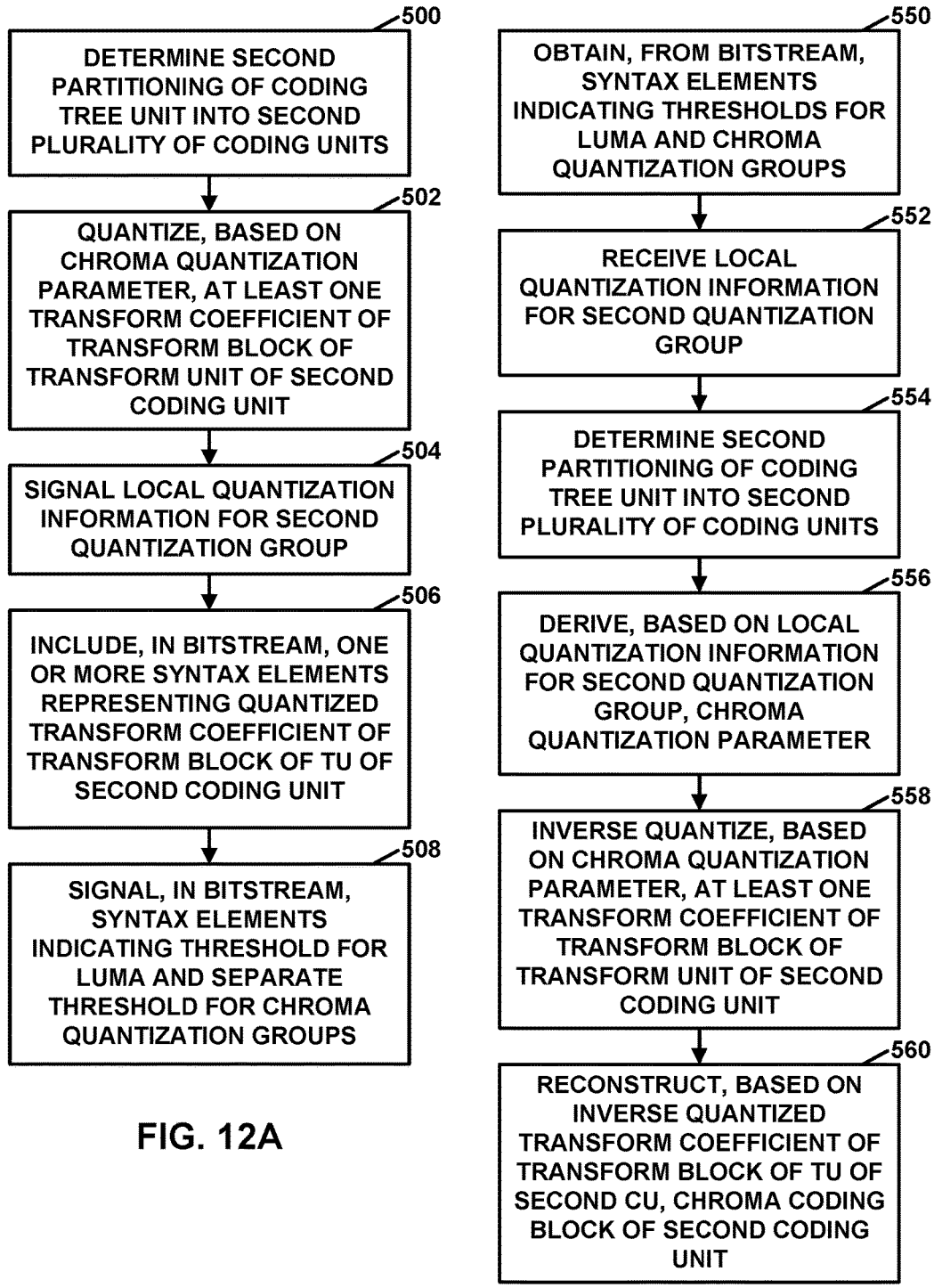
FIG. 12A is a flowchart illustrating an example operation of a video encoder for quantizing chroma transform coefficients, in accordance with a technique of this disclosure.
FIG. 12B is a flowchart illustrating an example operation of a video decoder for inverse quantizing chroma transform coefficients, in accordance with one or more techniques of this disclosure.

FIG. 12A is a flowchart illustrating an example operation of video encoder 20 for quantizing chroma transform coefficients, in accordance with a technique of this disclosure. As noted above, in some examples, if separate luma and chroma coding trees are allowed (as in case of I-slices for QTBT), separate delta QP signalling may be performed. In this case, separate thresholds and quantization group sizes may be defined for chroma samples. The example operation of FIG. 12A is consistent with such examples.

The example operation of FIG. 12A may be a continuation of the operation of FIG. 10. Thus, the plurality of CUs of FIG. 10 is a first plurality of CUs, where each respective CU of the first plurality of CUs corresponds to a respective luma coding block and no chroma coding blocks. Furthermore, the current quantization group of FIG. 10 is a first quantization group, the quantization parameter of FIG. 10 is a luma quantization parameter, the threshold of FIG. 10 is a first threshold, and the current CU of FIG. 10 is a first CU.

In the example of FIG. 12A, video encoder 20 may determine a second partitioning of the CTU into a second plurality of CUs (500). Each respective CU of the second plurality of CUs corresponds to a respective chroma coding block and no luma coding blocks. The second partitioning of the CTU may partition the CTU in a different way from the first partitioning of the CTU. For example, the second partitioning may include different numbers of CUs than the first partitioning, and the second partitioning may include one or more CUs having different shapes than in the first partitioning. Video encoder 20 may determine the second partitioning in a manner similar to the first partitioning. For instance, video encoder 20 may use QTBT or MTT partitioning to determine the second partitioning.

Additionally, in the example of FIG. 12A, video encoder 20 may quantize, based on a chroma quantization parameter, at least one transform coefficient of a second CU (502). Video encoder 20 may quantize the transform coefficient in accordance with examples provided elsewhere in this disclosure. The second CU is one of the CUs in the second quantization group. Furthermore, video encoder 20 may signal, in the bitstream, local quantization information for the second quantization group (504). The chroma quantization parameter is derivable based at least in part on the local quantization information for the second quantization group. In some examples, the chroma quantization parameter in the manner used in HEVC, as described elsewhere in this disclosure.

Video encoder 20 may also include, in the bitstream, one or more syntax elements representing the quantized transform coefficient of the second CU (506). Video encoder 20 may include the one or more syntax elements representing the quantized transform coefficient in accordance with examples provided elsewhere in this disclosure.

Furthermore, in the example of FIG. 12A, video encoder 20 may signal, in the bitstream, syntax elements indicating a threshold for luma quantization groups and a separate threshold for chroma quantization groups (508). The thresholds may have different values. Moreover, the thresholds do not need to have the same numerical ratio as the ratio of luma samples to chroma samples in a picture. Video encoder 20 may signal the first and second thresholds in a SPS, a PPS, a slice header, another high-level syntax parameter set, or elsewhere in the bitstream. The first quantization group is a luma quantization group because the local quantization information of the first quantization group is used in quantizing transform coefficients generated from luma samples. The second quantization group is a chroma quantization group because the local quantization information of the second quantization group is used in quantizing transform coefficients generated from chroma samples.

FIG. 12B is a flowchart illustrating an example operation of video decoder 30 for inverse quantizing chroma transform coefficients, in accordance with one or more techniques of this disclosure. Chroma transform coefficients are transform coefficients generated from chroma samples. The example operation of video decoder 30 shown in FIG. 12B corresponds to the example operation of video encoder 20 shown in FIG. 12A in that separate thresholds and quantization group sizes may be defined for chroma samples.

The example of FIG. 12B may be a continuation of the example operation of FIG. 11. Thus, the plurality of CUs of FIG. 11 is a first plurality of CUs and each respective CU of the first plurality of CUs corresponds to a respective luma coding block and no chroma coding blocks. Furthermore, the current quantization group of FIG. 11 is a first quantization group, the quantization parameter of FIG. 11 is a luma quantization parameter, the threshold of FIG. 11 is a first threshold, and the current CU of FIG. 11 is a first CU.

In the example of FIG. 12B, video decoder 30 may obtain, from the bitstream, syntax elements indicating thresholds for luma quantization groups and chroma quantization groups (550). For example, video decoder 30 may obtain the syntax elements indicating the first and second thresholds from a SPS, a PPS, a slice header, another high-level syntax parameter set, or elsewhere in the bitstream.

Video decoder 30 may receive, in the bitstream, local quantization information for a second quantization group (552). For example, video decoder 30 may parse one or more syntax elements from the bitstream as described in examples elsewhere in this disclosure. In this example, the second quantization group is a chroma quantization group. Furthermore, video decoder 30 may determine a second partitioning of the CTU into a second plurality of CUs (554). Each respective CU of the second plurality of CUs corresponds to a respective chroma coding block and no luma coding blocks. The second partitioning of the CTU may partition the CTU in a different way from the first partitioning of the CTU. Video decoder 30 may determine the second partitioning in accordance with examples provided elsewhere in this disclosure.

Furthermore, in the example of FIG. 12B, video decoder 30 may derive, based at least in part on the local quantization information for the second quantization group, a chroma quantization parameter (556). The second quantization group is defined as a group of successive, in coding order, CUs in the second plurality of CUs so that boundaries of the second quantization group must be boundaries of the CUs in the second plurality of CUs and a size of the second quantization group is greater than or equal to a second threshold. The second threshold may be the threshold for chroma quantization groups obtained in action (550). In some examples, video decoder 30 may derive the chroma quantization parameter in accordance with examples provided elsewhere in this disclosure. For instance, video decoder 30 may derive the chroma quantization parameter in the manner described with respect to HEVC.

Additionally, video decoder 30 may inverse quantize, based on the chroma quantization parameter, at least one transform coefficient of a second CU (558). The second CU is one of the CUs in the second quantization group. Video decoder 30 also reconstruct, based on inverse quantized transform coefficients of the second CU, a chroma coding block of the second CU (560). Video decoder 30 may inverse quantize the at least one transform coefficient and reconstruct the chroma coding block of the second CU in accordance with examples provided elsewhere in this disclosure.

Figure 13:
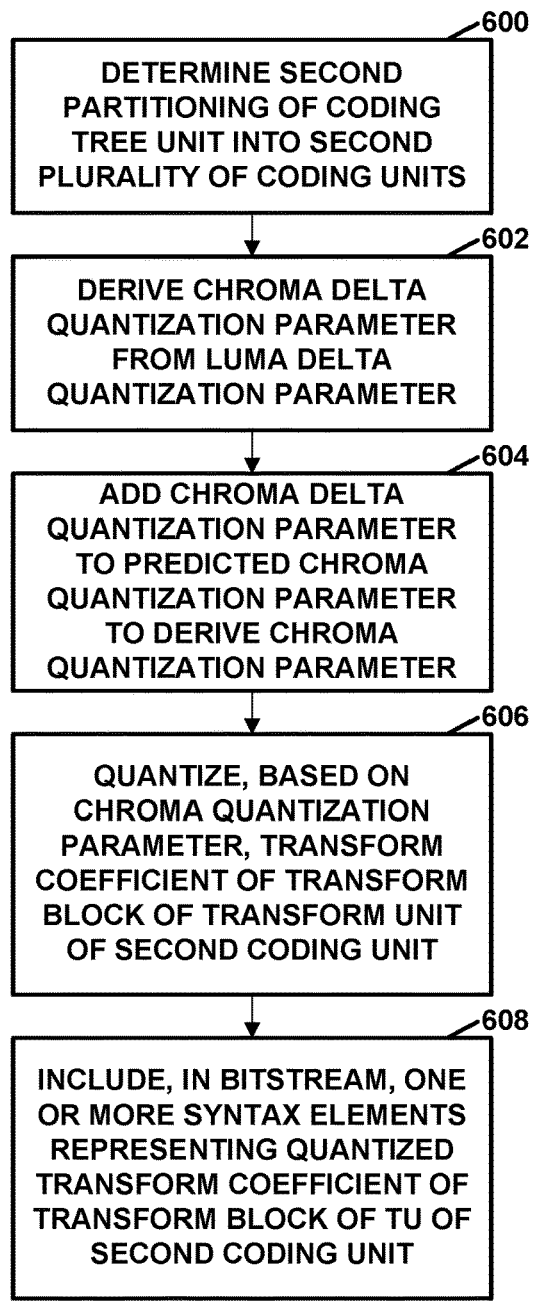
FIG. 13 is a flowchart illustrating an example operation of a video encoder to quantize chroma transform coefficients, in accordance with one or more techniques of this disclosure.

FIG. 13 is a flowchart illustrating an example operation of video encoder 20 to quantize chroma transform coefficients, in accordance with one or more techniques of this disclosure. As noted above, in some examples, the delta QP for chroma may be derived from corresponding luma delta QP. Then, in such examples, the derived delta QP is added to the predicted chroma QP to derive the actual chroma QP. The operation of FIG. 13 is consistent with such examples.

The example operation of FIG. 13 is a continuation of the operation of FIG. 10. As such, the plurality of CUs of FIG. 10 is a first plurality of CUs, each respective CU of the first plurality of CUs corresponds to a respective luma coding block and no chroma coding blocks, the quantization parameter of FIG. 10 is a luma quantization parameter, and the current CU of FIG. 10 is a first CU. A luma delta quantization parameter is derivable from the local quantization information for the first quantization group. For instance, in an example where the local quantization information for the first quantization group includes cu_qp_delta_abs and cu_qp_delta_sign_flag, the luma delta quantization parameter may be determined as cu_qp_delta_abs*(1−2*cu_qp_delta_sign_flag). The luma quantization parameter is based on the luma delta quantization parameter plus a predicted luma quantization parameter. For instance, the luma quantization parameter may be equal to the luma delta quantization parameter plus the predicted luma quantization parameter. In some examples, the luma quantization parameter may be determined as described in equation (1), above.

In the example of FIG. 13, video encoder 20 may determine a second partitioning of the CTU into a second plurality of CUs (600). Each respective CU of the second plurality of CUs corresponds to a respective chroma coding block and no luma coding blocks. The second partitioning of the CTU may partition the CTU in a different way from the first partitioning of the CTU. Video encoder 20 may determine the second partitioning of the CTU in accordance with examples provided elsewhere in this disclosure.

Figure 15:
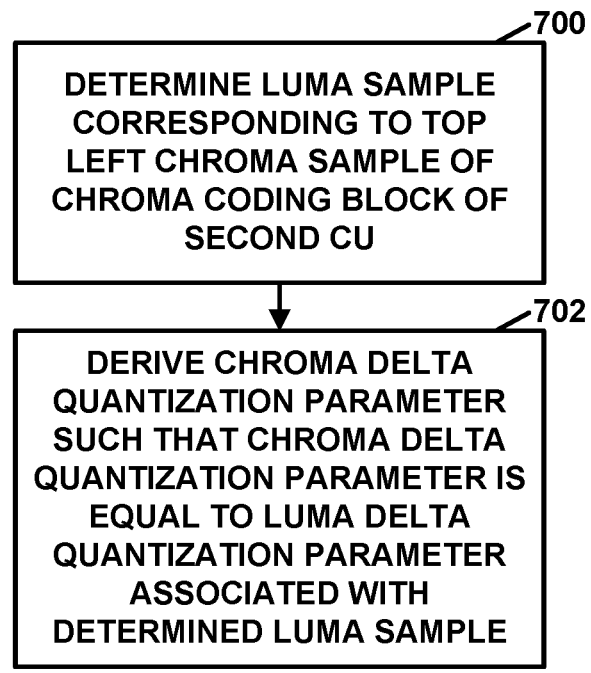
FIG. 15 is a flowchart illustrating an example operation for deriving a chroma delta quantization parameter, in accordance with one or more techniques of this disclosure.
Figure 16:
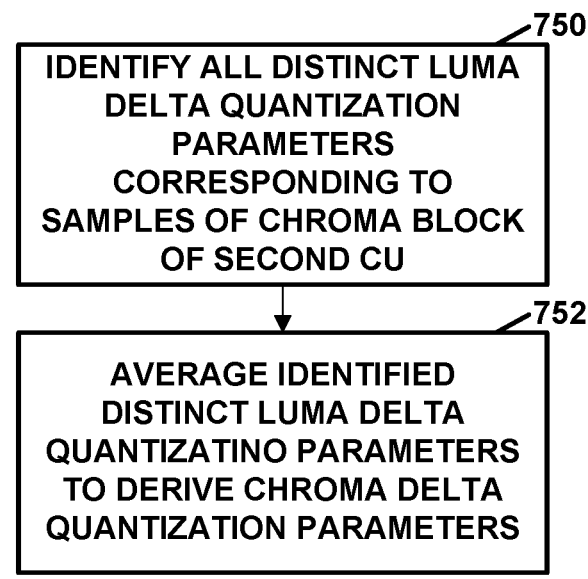
FIG. 16 is a flowchart illustrating an example operation for deriving a chroma delta quantization parameter, in accordance with one or more techniques of this disclosure.

Furthermore, in the example of FIG. 13, video encoder 20 may derive a chroma delta quantization parameter from the luma delta quantization parameter (602). Video encoder 20 may derive the chroma delta quantization parameter in various ways. For instance, FIG. 15, FIG. 16, and FIG. 17 provide examples of how video encoder 20 may derive the luma delta quantization parameter. Video encoder 20 may then add the chroma delta quantization parameter to a predicted chroma quantization parameter to derive a chroma quantization parameter (604).

Video encoder 20 may quantize, based on the chroma quantization parameter, a transform coefficient of a second CU (606). The second CU is in the second plurality of CUs. Furthermore, video encoder 20 may include, in the bitstream, one or more syntax elements representing the quantized transform coefficient of the second CU (608). Video encoder 20 may quantize the transform coefficient and include the one or more syntax elements representing the quantized transform coefficient in the bitstream in accordance with examples provided elsewhere in this disclosure.

Figure 14:
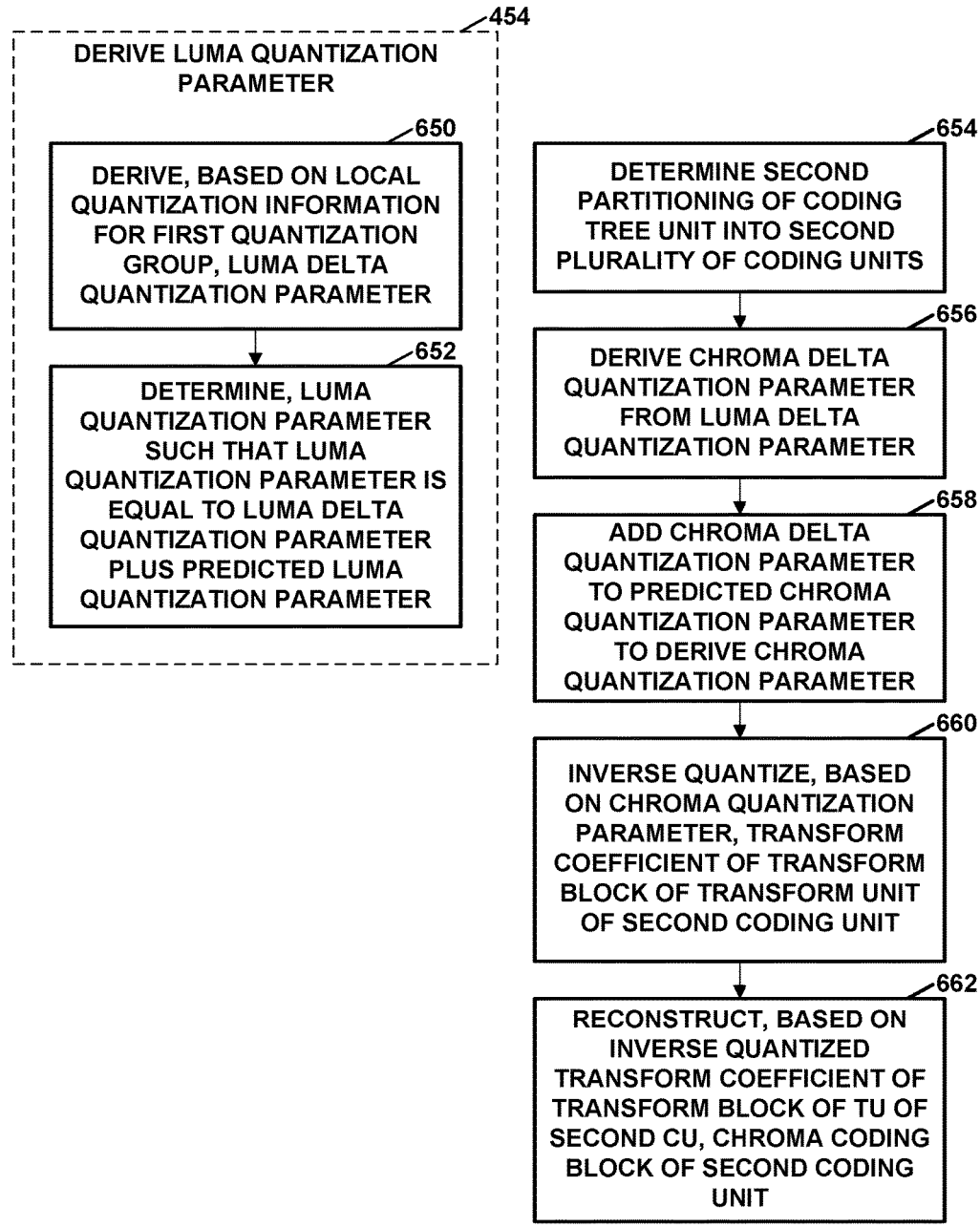
FIG. 14 is a flowchart illustrating an example operation of a video decoder for inverse quantizing chroma transform coefficients, in accordance with one or more techniques of this disclosure.

FIG. 14 is a flowchart illustrating an example operation of video decoder 30 for inverse quantizing chroma transform coefficients, in accordance with one or more techniques of this disclosure. The example operation of FIG. 14 corresponds to the operation of FIG. 13 and is a continuation of the operation of FIG. 11. As such, the plurality of CUs of FIG. 11 is a first plurality of CUs, each respective CU of the first plurality of CUs corresponds to a respective luma coding block and no chroma coding blocks, the quantization parameter of FIG. 11 is a luma quantization parameter, and the current CU of FIG. 11 is a first CU. As noted above, FIG. 11 includes an action (454) of deriving a luma quantization parameter. In the example of FIG. 14, the action of deriving the luma quantization parameter may comprise video decoder 30 deriving, based on the local quantization information for the first quantization group, a luma delta quantization parameter (650). For example, the local quantization for the first quantization group may include a cu_qp_delta_abs_syntax_element and a cu_qp_delta_sign_flag syntax element. In this example, video decoder 30 may determine the luma delta quantization parameter based on the local quantization information of the first quantization group as cu_qp_delta_abs*(1−2*cu_qp_delta_sign_flag). In other examples, the luma delta quantization parameter may be determined in different ways.

Additionally, as part of deriving the luma quantization parameter, video decoder 30 may determine the luma quantization parameter such that the luma quantization parameter is based on the luma delta quantization parameter plus a predicted luma quantization parameter (652). For example, the luma quantization parameter may be equal to the luma delta quantization parameter plus the predicted luma quantization parameter. In some examples, the luma quantization parameter may be based on the luma delta quantization parameter plus the predicted luma quantization parameter as shown in equation (1), above.

In the example of FIG. 14, the operation further comprises video decoder 30 determining a second partitioning of the CTU into a second plurality of CUs (654). Each respective CU of the second plurality of CUs corresponds to a respective chroma coding block and no luma coding blocks. In some examples, the second partitioning of the CTU partitions the CTU in a different way from the first partitioning of the CTU.

Furthermore, video decoder 30 may derive a chroma delta quantization parameter from the luma delta quantization parameter (656). Video decoder 30 may derive the chroma delta quantization parameter in various ways. FIG. 15, FIG. 16, and FIG. 17 provide examples of how video decoder 30 may derive the chroma delta quantization parameter. Additionally, video decoder 30 may add the chroma delta quantization parameter to a predicted chroma quantization parameter to derive a chroma quantization parameter (658).

Video decoder 30 may also inverse quantize, based on the chroma quantization parameter, at least one transform coefficient of a second CU (660). The second CU is in the second plurality of CUs. Additionally, video decoder 30 may reconstruct, based on inverse quantized transform coefficients of the second CU, a chroma coding block of the second CU (662). Video decoder 30 may inverse quantize the transform coefficient and reconstruct the chroma coding block in accordance with examples provided elsewhere in this disclosure.

FIG. 15 is a flowchart illustrating an example operation for deriving a chroma delta quantization parameter, in accordance with one or more techniques of this disclosure. As noted above, video encoder 20 may derive a chroma delta quantization parameter from a luma delta quantization parameter in action (602) of FIG. 13. Moreover, video decoder 30 may derive a chroma delta quantization parameter from a luma delta quantization parameter in action (656) of FIG. 14. The operation of FIG. 15 is an example of how a video coder (e.g., video encoder 20 or video decoder) may derive the chroma delta quantization parameter from a luma delta quantization parameter in actions (602) or (656). As noted elsewhere in this disclosure, in some examples where separate luma and chroma trees are allowed, a delta QP for chroma may be derived from a corresponding luma delta QP such that the delta QP for the chroma block is set to the delta QP for the luma sample corresponding to a particular chroma sample (e.g., the top left chroma sample) of the block. The example operation of FIG. 15 is consistent with such examples.

In the example of FIG. 15, the video coder may determine a luma sample corresponding to a particular top left chroma sample of a chroma coding block of the second CU (700). The particular chroma sample may be at a predefined position (e.g., a top left chroma sample) or a signaled position. The luma sample corresponding to the particular chroma sample of the chroma coding block of the second CU may be collocated with the particular chroma sample of the chroma coding block. Additionally, the video coder may derive the chroma delta quantization parameter such that the chroma delta quantization parameter is equal to the luma delta quantization parameter (702). The luma delta quantization parameter is associated with the determined luma sample.

FIG. 16 is a flowchart illustrating an example operation for deriving a chroma delta quantization parameter, in accordance with one or more techniques of this disclosure. As noted above, video encoder 20 may derive a chroma delta quantization parameter from a luma delta quantization parameter in action (602) of FIG. 13. Moreover, video decoder 30 may derive a chroma delta quantization parameter from a luma delta quantization parameter in action (656) of FIG. 14. The operation of FIG. 15 is an example of how a video coder (e.g., video encoder 20 or video decoder) may derive the chroma delta quantization parameter from a luma delta quantization parameter in actions (602) or (656). As noted elsewhere in this disclosure, in some examples where separate luma and chroma trees are allowed, a delta QP for chroma may be derived such that all the distinct luma delta QP values corresponding to the samples of the chroma block are averaged. The example operation of FIG. 16 is consistent with such examples.

In the example of FIG. 16, a video coder (e.g., video encoder 20 or video decoder 30) may identify all distinct luma delta quantization parameters for luma samples corresponding to samples of the chroma block of the second CU (750). The identified luma delta quantization parameters include the first luma delta quantization parameter. For example, the video coder may scan through each sample of the chroma block of the second CU and determine a luma delta quantization parameter used in quantizing a collocated luma sample. Additionally, the video coder may average the identified distinct luma delta quantization parameters to derive the chroma delta quantization parameter (752). For example, the video coder may calculate a mean of the identified distinct luma delta quantization parameters.

Figure 17A:
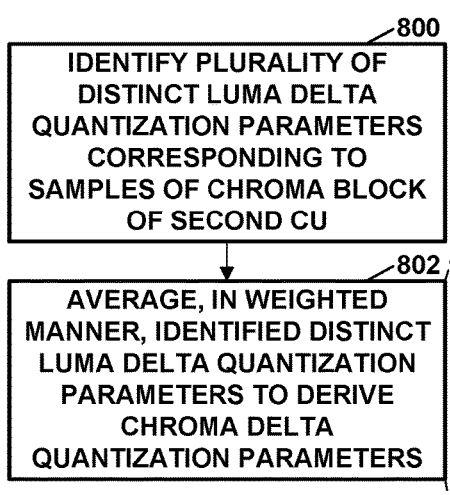
FIG. 17A is a flowchart illustrating an example operation for deriving a chroma delta quantization parameter, in accordance with one or more techniques of this disclosure.

FIG. 17A is a flowchart illustrating an example operation for deriving a chroma delta quantization parameter, in accordance with one or more techniques of this disclosure. As noted above, video encoder 20 may derive a chroma delta quantization parameter from a luma delta quantization parameter in action (602) of FIG. 13. Moreover, video decoder 30 may derive a chroma delta quantization parameter from a luma delta quantization parameter in action (656) of FIG. 14. The operation of FIG. 17 is an example of how a video coder (e.g., video encoder 20 or video decoder) may derive the chroma delta quantization parameter from a luma delta quantization parameter in actions (602) or (656). As noted elsewhere in this disclosure, in some examples where separate luma and chroma trees are allowed, a delta QP for chroma may be derived such that all the distinct luma delta QP values corresponding to the samples of the chroma block are averaged in a weighted manner. The example operation of FIG. 17A is consistent with such examples.

In the example of FIG. 17A, a video coder (e.g., video encoder 20 or video decoder 30) identifies a plurality of distinct luma delta quantization parameters (800). The plurality of distinct luma delta quantization parameters includes each distinct luma delta quantization parameter for luma samples corresponding to samples of the chroma block of the second CU. Additionally, in the example of FIG. 17A, the video coder averages, in a weighted manner, the plurality of distinct luma delta quantization parameters to derive the chroma delta quantization parameter (802).

Figure 17B:
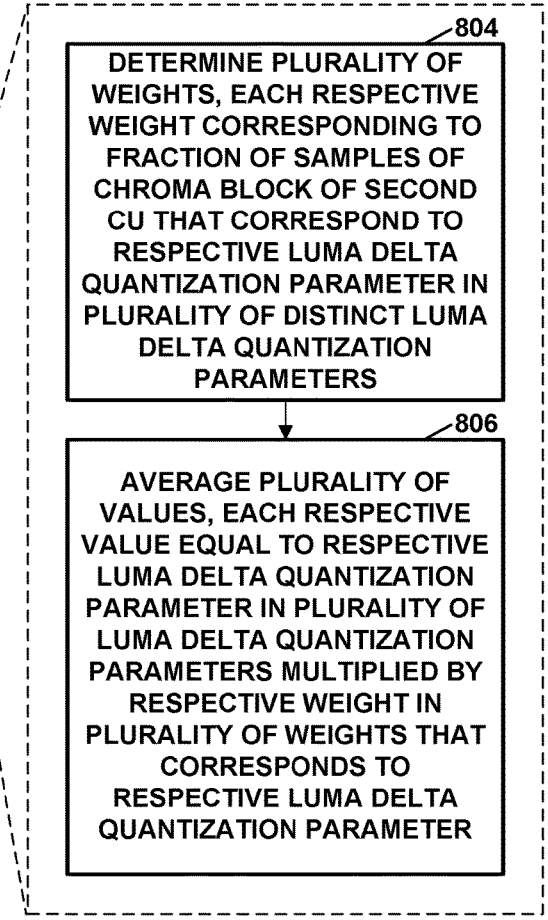
FIG. 17B is a flowchart illustrating an example operation for averaging identified distinct luma delta quantization parameters in a weighted manner, in accordance with one or more techniques of this disclosure.

FIG. 17B is a flowchart illustrating an example operation for averaging identified distinct luma delta quantization parameters in a weighted manner, in accordance with one or more techniques of this disclosure. The operation of FIG. 17B may be one example of how a video coder may average identified distinct luma delta quantization parameters in action (802) of FIG. 17A.

In the example of FIG. 17B, the video coder may determine a plurality of weights (804). For example, for each respective weight of the plurality of weights, the respective weight corresponds to a fraction of samples of the chroma block of the second CU that correspond to a respective luma delta quantization parameter in the plurality of distinct luma delta quantization parameters. Furthermore, the video decoder may average a plurality of values (806). For example, each respective value in the plurality of values may be equal to a respective luma delta quantization parameter in the plurality of luma delta quantization parameters multiplied by a respective weight in the plurality of weights that corresponds to the respective luma delta quantization parameter.

Figures 18A, 18B:
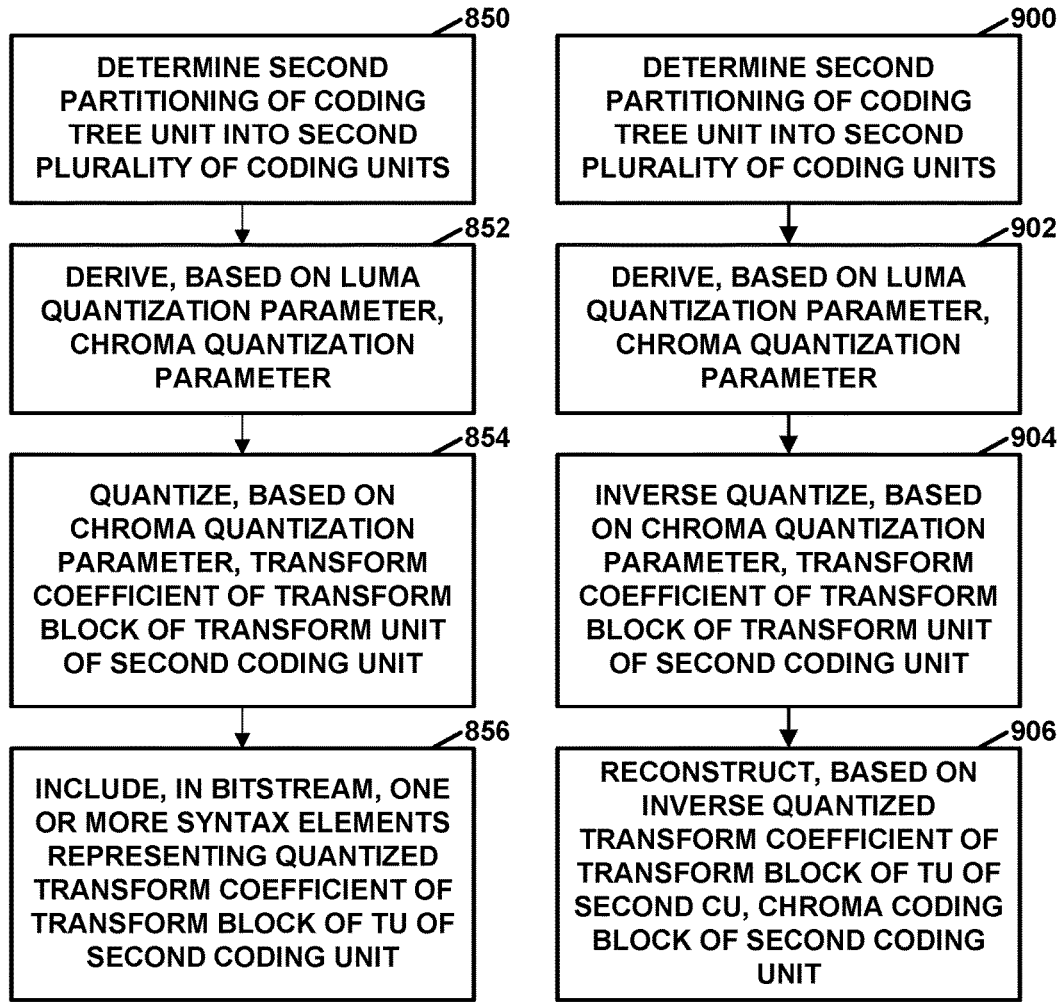
FIG. 18A is a flowchart illustrating an example operation for quantizing chroma transform coefficients, in accordance with one or more techniques of this disclosure.
FIG. 18B is a flowchart illustrating an example operation for inverse quantizing chroma transform coefficients, in accordance with one or more techniques of this disclosure.

FIG. 18A is a flowchart illustrating an example operation for quantizing chroma transform coefficients, in accordance with one or more techniques of this disclosure. As noted above, in some examples, if separate luma and chroma coding trees are allowed, separate delta QP signalling may be performed. In this case, chroma QP values may be directly derived from luma QP values. The example operation of FIG. 18A is consistent with such examples.

The example operation of FIG. 18A may be a continuation of the operation of FIG. 10. Thus, the plurality of CUs of FIG. 10 is a first plurality of CUs, each respective CU of the first plurality of CUs corresponds to a respective luma coding block and no chroma coding blocks, the current quantization group of FIG. 10 is a first quantization group, the quantization parameter of FIG. 10 is a luma quantization parameter, the threshold of FIG. 10 is a first threshold, and the current CU of FIG. 10 is a first CU.

In the example of FIG. 18A, video encoder 20 may determine a second partitioning of the CTU into a second plurality of CUs (850). Each respective CU of the second plurality of CUs corresponds to a respective chroma coding block and no luma coding blocks. The second partitioning of the CTU may partition the CTU in a different way from the first partitioning of the CTU. Video encoder 20 may determine the second partitioning in accordance with examples provided elsewhere in this disclosure.

Additionally, video encoder 20 may derive, based on the luma quantization parameter, a chroma quantization parameter (852). For example, video encoder 20 may use the luma quantization parameter to look up a value in a lookup table. In this example, video encoder 20 may then apply a chroma QP offset to the value to derive the chroma quantization parameter.

Furthermore, video encoder 20 may quantize, based on the chroma quantization parameter, a transform coefficient of a second CU (854). The second CU is in the second plurality of CUs. In addition, video encoder 20 may include, in the bitstream, one or more syntax elements representing the quantized transform coefficient of the second CU (856). Video encoder 20 may quantize the transform coefficient and include the quantized transform coefficient in the bitstream in accordance with examples provided elsewhere in this disclosure.

FIG. 18B is a flowchart illustrating an example operation for inverse quantizing chroma transform coefficients, in accordance with one or more techniques of this disclosure. As noted above, in some examples, if separate luma and chroma coding trees are allowed, separate delta QP signalling may be performed. In this case, chroma QP values may be directly derived from luma QP values. The example operation of FIG. 18B is consistent with such examples.

The example operation of FIG. 18B may be a continuation of the operation of FIG. 11. Thus, the plurality of CUs of FIG. 11 is a first plurality of CUs, each respective CU of the first plurality of CUs corresponds to a respective luma coding block and no chroma coding blocks, the current quantization group of FIG. 11 is a first quantization group, the quantization parameter of FIG. 11 is a luma quantization parameter, the threshold of FIG. 11 is a first threshold, and the current CU of FIG. 11 is a first CU.

In the example of the FIG. 18B, video decoder 30 may determine a second partitioning of the CTU into a second plurality of CUs (900). Each respective CU of the second plurality of CUs corresponds to a respective chroma coding block and no luma coding blocks. The second partitioning of the CTU may partition the CTU in a different way from the first partitioning of the CTU. Video decoder 30 may determine the second partitioning in accordance with examples provided elsewhere in this disclosure.

Furthermore, video decoder 30 may derive, based on the luma quantization parameter, a chroma quantization parameter (902). For example, video decoder 30 may use the luma quantization parameter to look up a value in a lookup table. In this example, video decoder 30 may then apply a chroma QP offset to the value to derive the chroma quantization parameter.

Additionally, video decoder 30 may inverse quantize, based on the chroma quantization parameter, a transform coefficient of a second CU (904). The second CU is in the second plurality of CUs. Furthermore, video decoder 30 may reconstruct, based on inverse quantized transform coefficients of the second CU, a chroma coding block of the second CU (906). Video decoder 30 may inverse quantize the transform coefficient and reconstruct the chroma coding block in accordance with examples provided elsewhere in this disclosure.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, by a video decoder, in a bitstream that comprises an encoded representation of the video data, local quantization information for a current quantization group;
   determining, by the video decoder, a partitioning of a coding tree unit (CTU) of a picture of the video data into a plurality of coding units (CUs), the plurality of CUs including one or more non-square CUs;
   deriving, by the video decoder, based at least in part on the local quantization information for the current quantization group, a quantization parameter, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group;
   inverse quantizing, by the video decoder, based on the quantization parameter, at least one transform coefficient of a current CU, the current CU being one of the CUs in the current quantization group; and
   reconstructing, by the video decoder, based on inverse quantized transform coefficients of the current CU, a coding block of the current CU.

2. The method of claim 1, wherein the current quantization group is not square.

3. The method of claim 1, further comprising obtaining, by the video decoder, from the bitstream, an indication of the threshold.

4. The method of claim 1, further comprising determining, by the video decoder, based on an accumulated size of CUs in the current quantization group being greater than or equal to the threshold, that a next quantization group starts with a next CU of the CTU.

5. The method of claim 1, wherein the threshold is a first threshold and, the method further comprising starting, by the video decoder, a new quantization group for each CU of the CTU with size greater than or equal to a second threshold, even when an accumulated size of the current quantization group is not greater than the first threshold.

6. The method of claim 1, wherein, for each respective quantization group of a plurality of quantization groups that includes the current quantization group, when the respective quantization group contains non-zero quantized coefficients, at most one set of local quantization information is permitted to be signaled in the bitstream for the respective quantization group.

7. The method of claim 1, wherein the threshold is a first threshold, the set of local quantization information for the current quantization group is a first set of local quantization information for the current quantization group, the quantization parameter is a first quantization parameter, the current CU is a first CU, and the method further comprises:
   based on the current quantization group including a CU having a size greater than a second threshold, obtaining, by the video decoder, from the bitstream, a second set of local quantization information for the current quantization group;
   deriving, by the video decoder, based at least in part on the second set of local quantization information for the current quantization group, a second quantization parameter; and
   inverse quantizing, by the video decoder, based on the second quantization parameter, at least one transform coefficient of the second CU.

8. The method of claim 1, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the method further comprises:
   receiving, by the video decoder, in the bitstream, local quantization information for a second quantization group;
   determining, by the video decoder, a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;

deriving, by the video decoder, based at least in part on the local quantization information for the second quantization group, a chroma quantization parameter, wherein the second quantization group is defined as a group of successive, in coding order, CUs in the second plurality of CUs so that boundaries of the second quantization group must be boundaries of the CUs in the second plurality of CUs and a size of the second quantization group is greater than or equal to a second threshold;

inverse quantizing, by the video decoder, based on the chroma quantization parameter, at least one transform coefficient of a second CU, the second CU being one of the CUs in the second quantization group; and reconstructing, by the video decoder, based on inverse quantized transform coefficients of the second CU, a chroma coding block of the second CU.

9. The method of claim 1, wherein the plurality of CUs is a first plurality of CUs, each respective CU of the first plurality of CUs corresponds to a respective luma coding block and no chroma coding blocks, the quantization parameter is a luma quantization parameter, the current quantization group is a first quantization group, and the current CU is a first CU, wherein deriving the quantization parameter comprises:
deriving, by the video decoder, based on the local quantization information for the first quantization group, a luma delta quantization parameter; and
determining, by the video decoder, the luma quantization parameter such that the luma quantization parameter is based on the luma delta quantization parameter plus a predicted luma quantization parameter, and wherein the method further comprises:
determining, by the video decoder, a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;

deriving, by the video decoder, a chroma delta quantization parameter from the luma delta quantization parameter;

adding, by the video decoder, the chroma delta quantization parameter to a predicted chroma quantization parameter to derive a chroma quantization parameter;

inverse quantizing, by the video decoder, based on the chroma quantization parameter, at least one transform coefficient of a second CU, the second CU being in the second plurality of CUs; and reconstructing, by the video decoder, based on inverse quantized transform coefficients of the second CU, a chroma coding block of the second CU.

10. The method of claim 9, wherein deriving the chroma delta quantization parameter comprises:
determining, by the video decoder, a luma sample corresponding to a top left chroma sample of a chroma coding block of the second CU; and
deriving, by the video decoder, the chroma delta quantization parameter such that the chroma delta quantization parameter is equal to the luma delta quantization parameter, wherein the luma delta quantization parameter is associated with the determined luma sample.

11. The method of claim 9, wherein the luma delta quantization parameter is a first luma delta quantization parameter, and deriving the chroma delta quantization parameter comprises:
identifying, by the video decoder, all distinct luma delta quantization parameters for luma samples corresponding to samples of the chroma block of the second CU, the identified luma delta quantization parameters including the first luma delta quantization parameter; and
averaging, by the video decoder, the identified distinct luma delta quantization parameters to derive the chroma delta quantization parameter.

12. The method of claim 9, wherein the luma delta quantization parameter is a first luma delta quantization parameter, and deriving the chroma delta quantization parameter comprises:
identifying, by the video decoder, a plurality of distinct luma delta quantization parameters, the plurality of distinct luma delta quantization parameters including each distinct luma delta quantization parameter for luma samples corresponding to samples of the chroma block of the second CU, the plurality of distinct luma delta quantization parameters including the first luma delta quantization parameter; and
averaging, by the video decoder, in a weighted manner, the plurality of distinct luma delta quantization parameters to derive the chroma delta quantization parameter.

13. The method of claim 12, further comprising:
determining, by the video decoder, a plurality of weights, wherein for each respective weight of the plurality of weights, the respective weight corresponds to a fraction of samples of the chroma block of the second CU that correspond to a respective luma delta quantization parameter in the plurality of distinct luma delta quantization parameters, wherein averaging, in the weighted manner, the plurality of distinct luma delta quantization parameters comprises averaging, by the video decoder, a plurality of values, each respective value in the plurality of values being equal to a respective luma delta quantization parameter in the plurality of luma delta quantization parameters multiplied by a respective weight in the plurality of weights that corresponds to the respective luma delta quantization parameter.

14. The method of claim 1, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the method further comprises:
determining, by the video decoder, a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;

deriving, by the video decoder, based on the luma quantization parameter, a chroma quantization parameter;

inverse quantizing, by the video decoder, based on the chroma quantization parameter, a transform coefficient of a second CU, the second CU being in the second plurality of CUs; and reconstructing, by the video decoder, based on inverse quantized transform coefficients of the second CU, a chroma coding block of the second CU.

15. A method of encoding video data, the method comprising:

determining, by a video encoder, a partitioning of a coding tree unit (CTU) of a picture of the video data into a plurality of coding units (CUs), the plurality of CUs including one or more non-square CUs;

quantizing, by the video encoder, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group;

signaling, by the video encoder, in a bitstream that comprises an encoded representation of the video data, local quantization information for the current quantization group, wherein the quantization parameter is derivable based at least in part on the local quantization information for the current quantization group; and including, by the video encoder, in the bitstream, one or more syntax elements representing the quantized transform coefficient of the current CU.

16. The method of claim 15, wherein the current quantization group is not square.

17. The method of claim 15, further comprising signaling, by the video encoder, in the bitstream, an indication of the threshold.

18. The method of claim 15, further comprising determining, by the video encoder, based on an accumulated size of CUs in the current quantization group being greater than or equal to the threshold, that a next quantization group of the plurality of quantization groups starts with a next CU of the CTU.

19. The method of claim 15, wherein the threshold is a first threshold and, the method further comprising starting, by the video encoder, a new quantization group for each CU of the CTU with size greater than or equal to a second threshold, even when an accumulated size of the current quantization group is not greater than the first threshold.

20. The method of claim 15, wherein, for each respective quantization group of a plurality of quantization groups that includes the current quantization group, when the respective quantization group contains non-zero quantized coefficients, at most one set of local quantization information is permitted to be signaled in the bitstream for the respective quantization group.

21. The method of claim 15, wherein the threshold is a first threshold, the set of local quantization information for the current quantization group is a first set of local quantization information for the current quantization group, the quantization parameter is a first quantization parameter, the current CU is a first CU, and the method further comprises:

based on the current quantization group including a second CU having a size greater than a second threshold, signaling, by the video encoder, in the bitstream, a second set of local quantization information for the current quantization group;

deriving, by the video encoder, based at least in part on the second set of local quantization information for the current quantization group, a second quantization parameter; and quantizing, by the video encoder, based on the second quantization parameter, at least one transform coefficient of the second CU.

22. The method of claim 15, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the method further comprises:

determining, by the video encoder, a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;

quantizing, by the video encoder, based on a chroma quantization parameter, at least one transform coefficient of a second CU, the second CU being one of the CUs in the second quantization group;

signaling, by the video encoder, in the bitstream, local quantization information for the second quantization group, wherein the chroma quantization parameter is derivable based at least in part on the local quantization information for the second quantization group; and including, by the video encoder, in the bitstream, one or more syntax elements representing the quantized transform coefficient of the second CU.

23. The method of claim 15, wherein the plurality of CUs is a first plurality of CUs, each respective CU of the first plurality of CUs corresponds to a respective luma coding block and no chroma coding blocks, the quantization parameter is a luma quantization parameter, the current quantization group is a first quantization group, and the current CU is a first CU, wherein a luma delta quantization parameter is derivable from the local quantization information for the first quantization group, wherein the luma quantization parameter is based on the luma delta quantization parameter plus a predicted luma quantization parameter;

wherein the method further comprises:

determining, by the video encoder, a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;

deriving, by the video encoder, a chroma delta quantization parameter from the luma delta quantization parameter;

adding, by the video encoder, the chroma delta quantization parameter to a predicted chroma quantization parameter to derive a chroma quantization parameter;

quantizing, by the video encoder, based on the chroma quantization parameter, a transform coefficient of a second CU, the second CU being in the second plurality of CUs; and including, by the video encoder, in the bitstream, one or more syntax elements representing the quantized transform coefficient of the second CU.

24. The method of claim 23, wherein deriving the chroma delta quantization parameter comprises:

determining, by the video encoder, a luma sample corresponding to a predefined or signaled position such as a top left chroma sample of a chroma coding block of the second CU; and deriving, by the video encoder, the chroma delta quantization parameter such that the chroma delta quantization parameter is equal to the luma delta quantization parameter, wherein the luma delta quantization parameter is associated with the determined luma sample.

25. The method of claim 23, wherein the luma delta quantization parameter is a first luma delta quantization parameter, and deriving the chroma delta quantization parameter comprises:

identifying, by the video encoder, all distinct luma delta quantization parameters for luma samples corresponding to samples of a chroma block of the second CU, the identified luma delta quantization parameters including the first luma delta quantization parameter; and averaging, by the video decoder, the identified distinct luma delta quantization parameters to derive the chroma delta quantization parameter.

26. The method of claim 23, wherein the luma delta quantization parameter is a first luma delta quantization parameter, and deriving the chroma delta quantization parameter comprises:

identifying, by the video encoder, a plurality of distinct luma delta quantization parameters, the plurality of distinct luma delta quantization parameters including each distinct luma delta quantization parameter for luma samples corresponding to samples of a chroma block of the second CU, the plurality of distinct luma delta quantization parameters including the first luma delta quantization parameter; and averaging, by the video encoder, in a weighted manner, the plurality of distinct luma delta quantization parameters to derive the chroma delta quantization parameter.

27. The method of claim 26, further comprising:

determining, by the video encoder, a plurality of weights, wherein for each respective weight of the plurality of weights, the respective weight corresponds to a fraction of samples of the chroma block of the second CU that correspond to a respective luma delta quantization parameter in the plurality of distinct luma delta quantization parameters, wherein averaging, in the weighted manner, the plurality of distinct luma delta quantization parameters comprises averaging, by the video encoder, a plurality of values, each respective value in the plurality of values being equal to a respective luma delta quantization parameter in the plurality of luma delta quantization parameters multiplied by a respective weight in the plurality of weights that corresponds to the respective luma delta quantization parameter.

28. The method of claim 15, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the method further comprises:

determining, by the video encoder, a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;

deriving, by the video encoder, based on the luma quantization parameter, a chroma quantization parameter;

quantizing, by the video encoder, based on the chroma quantization parameter, a transform coefficient of a second CU, the second CU being in the second plurality of CUs; and including, by the video encoder, in the bitstream, one or more syntax elements representing the quantized transform coefficient of the second CU.

29. An apparatus for decoding video data comprising:
one or more storage media configured to store the video data; and
one or more processors configured to:
receive in a bitstream that comprises an encoded representation of the video data, local quantization information for a current quantization group;
determine a partitioning of a coding tree unit (CTU) of a picture of the video data into a plurality of coding units (CUs), the plurality of CUs including one or more non-square CUs;
derive, based at least in part on the local quantization information for the current quantization group, a quantization parameter, wherein the current quantization group is defined as a group of successive, in coding order, CUs so that boundaries of the current quantization group must be boundaries of the CUs and a size of the current quantization group is greater than or equal to a threshold, and at least one CU of the plurality of CUs is included in a non-square quantization group;
inverse quantize, based on the quantization parameter, at least one transform coefficient of a current CU, the current CU being one of the CUs in the current quantization group; and
reconstruct, based on inverse quantized transform coefficients of the current CU, a coding block of the current CU.

30. The apparatus of claim 29, wherein the current quantization group is not square.

31. The apparatus of claim 29, wherein the one or more processors are further configured to obtain, from the bitstream, an indication of the threshold.

32. The apparatus of claim 29, wherein the one or more processors are further configured to determine, based on an accumulated size of CUs in the current quantization group being greater than or equal to the threshold, that a next quantization group starts with a next CU of the CTU.

33. The apparatus of claim 29, wherein the threshold is a first threshold and, the one or more processors are further configured to start a new quantization group for each CU of the CTU with size greater than or equal to a second threshold, even when an accumulated size of the current quantization group is not greater than the first threshold.

34. The apparatus of claim 29, wherein, for each respective quantization group of a plurality of quantization groups that includes the current quantization group, when the respective quantization group contains non-zero quantized coefficients, at most one set of local quantization information is permitted to be signaled in the bitstream for the respective quantization group.

35. The apparatus of claim 29, wherein the threshold is a first threshold, the set of local quantization information for the current quantization group is a first set of local quantization information for the current quantization group, the quantization parameter is a first quantization parameter, the current CU is a first CU, and the one or more processors are further configured to:
based on the current quantization group including a CU having a size greater than a second threshold, obtain, from the bitstream, a second set of local quantization information for the current quantization group;
derive, based at least in part on the second set of local quantization information for the current quantization group, a second quantization parameter; and
inverse quantize, based on the second quantization parameter, at least one transform coefficient of the second CU.

36. The apparatus of claim 29, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the one or more processors are further configured to:
receive, in the bitstream, local quantization information for a second quantization group;
determine a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;
derive, based at least in part on the local quantization information for the second quantization group, a chroma quantization parameter, wherein the second quantization group is defined as a group of successive, in coding order, CUs in the second plurality of CUs so that boundaries of the second quantization group must be boundaries of the CUs in the second plurality of CUs and a size of the second quantization group is greater than or equal to a second threshold;
inverse quantize, based on the chroma quantization parameter, at least one transform coefficient of a second CU, the second CU being one of the CUs in the second quantization group; and
reconstruct, based on inverse quantized transform coefficients of the second CU, a chroma coding block of the second CU.

37. The apparatus of claim 29, wherein the plurality of CUs is a first plurality of CUs, each respective CU of the first plurality of CUs corresponds to a respective luma coding block and no chroma coding blocks, the quantization parameter is a luma quantization parameter, the current quantization group is a first quantization group, and the current CU is a first CU,
wherein the one or more processors are configured such that, as part of deriving the quantization parameter, the one or more processors:
derive, based on the local quantization information for the first quantization group, a luma delta quantization parameter; and
determine the luma quantization parameter such that the luma quantization parameter is based on the luma delta quantization parameter plus a predicted luma quantization parameter;
wherein the one or more processors are further configured to:
determine a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;
derive a chroma delta quantization parameter from the luma delta quantization parameter;
add the chroma delta quantization parameter to a predicted chroma quantization parameter to derive a chroma quantization parameter;
inverse quantize, based on the chroma quantization parameter, at least one transform coefficient of a second CU, the second CU being in the second plurality of CUs; and
reconstruct, based on inverse quantized transform coefficients of the second CU, a chroma coding block of the second CU.

38. The apparatus of claim 37, wherein the one or more processors are configured such that, as part of deriving the chroma delta quantization parameter, the one or more processors:
determine a luma sample corresponding to a predefined or signaled chroma position, such as top left chroma sample of a chroma coding block of the second CU; and
derive the chroma delta quantization parameter such that the chroma delta quantization parameter is equal to the luma delta quantization parameter, wherein the luma delta quantization parameter is associated with the determined luma sample.

39. The apparatus of claim 37, wherein the luma delta quantization parameter is a first luma delta quantization parameter, and the one or more processors are configured such that, as part of deriving the chroma delta quantization parameter, the one or more processors:
identify all distinct luma delta quantization parameters for luma samples corresponding to samples of the chroma block of the second CU, the identified luma delta quantization parameters including the first luma delta quantization parameter; and
average the identified distinct luma delta quantization parameters to derive the chroma delta quantization parameter.

40. The apparatus of claim 37, wherein the luma delta quantization parameter is a first luma delta quantization parameter, and the one or more processors are configured such that, as part of deriving the chroma delta quantization parameter, the one or more processors:
identify a plurality of distinct luma delta quantization parameters, the plurality of distinct luma delta quantization parameters including each distinct luma delta quantization parameter for luma samples corresponding to samples of the chroma block of the second CU, the plurality of distinct luma delta quantization parameters including the first luma delta quantization parameter; and
average, in a weighted manner, the plurality of distinct luma delta quantization parameters to derive the chroma delta quantization parameter.

41. The apparatus of claim 40, wherein the one or more processors are further configured to:
  determine a plurality of weights, wherein for each respective weight of the plurality of weights, the respective weight corresponds to a fraction of samples of the chroma block of the second CU that correspond to a respective luma delta quantization parameter in the plurality of distinct luma delta quantization parameters,
  wherein the one or more processors are configured such that, as part of averaging, in the weighted manner, the plurality of distinct luma delta quantization parameters, the one or more processors average a plurality of values, each respective value in the plurality of values being equal to a respective luma delta quantization parameter in the plurality of luma delta quantization parameters multiplied by a respective weight in the plurality of weights that corresponds to the respective luma delta quantization parameter.

42. The apparatus of claim 29, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the one or more processors are further configured to:
  determine a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;
  derive, based on the luma quantization parameter, a chroma quantization parameter; and
  inverse quantize, based on the chroma quantization parameter, a transform coefficient of a second CU, the second CU being in the second plurality of CUs; and
  reconstruct, based on inverse quantized transform coefficients of the second CU, a chroma coding block of the second CU.

43. An apparatus for encoding video data, the apparatus comprising:
  one or more storage media configured to store the video data; and
  one or more processors configured to:
    determine a partitioning of a coding tree unit (CTU) of a picture of the video data into a plurality of coding units (CUs), the plurality of CUs including one or more non-square CUs;
    quantize, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group;
    signal, in a bitstream that comprises an encoded representation of the video data, local quantization information for the current quantization group, wherein the quantization parameter is derivable based at least in part on the local quantization information for the current quantization group; and
    include, in the bitstream, one or more syntax elements representing the quantized transform coefficient of the current CU.

44. The apparatus of claim 43, wherein the current quantization group is not square.

45. The apparatus of claim 43, wherein the one or more processors are configured to signal, in the bitstream, an indication of the threshold.

46. The apparatus of claim 43, wherein the one or more processors are further configured to determine, based on an accumulated size of CUs in the current quantization group being greater than or equal to the threshold, that a next quantization group of the plurality of quantization groups starts with a next CU of the CTU.

47. The apparatus of claim 43, wherein the threshold is a first threshold and, the one or more processors are further configured to start a new quantization group for each CU of the CTU with size greater than or equal to a second threshold, even when an accumulated size of the current quantization group is not greater than the first threshold.

48. The apparatus of claim 43, wherein, for each respective quantization group of a plurality of quantization groups that includes the current quantization group, when the respective quantization group contains non-zero quantized coefficients, at most one set of local quantization information is permitted to be signaled in the bitstream for the respective quantization group.

49. The apparatus of claim 43, wherein the threshold is a first threshold, the set of local quantization information for the current quantization group is a first set of local quantization information for the current quantization group, the quantization parameter is a first quantization parameter, the current CU is a first CU, and the one or more processors are further configured to:
  based on the current quantization group including a second CU having a size greater than a second threshold, signal, in the bitstream, a second set of local quantization information for the current quantization group;
  derive, based at least in part on the second set of local quantization information for the current quantization group, a second quantization parameter; and
  quantize, based on the second quantization parameter, at least one transform coefficient of the second CU.

50. The apparatus of claim 43, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the one or more processors are further configured to:
  determine a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;
  quantize, based on a chroma quantization parameter, at least one transform coefficient of a second CU, the second CU being one of the CUs in the second quantization group;
  signal, in the bitstream, local quantization information for the second quantization group, wherein the chroma quantization parameter is derivable based at least in part on the local quantization information for the second quantization group; and include, in the bitstream, one or more syntax elements representing the quantized transform coefficient of the second CU.

51. The apparatus of claim 43,
wherein the plurality of CUs is a first plurality of CUs, each respective CU of the first plurality of CUs corresponds to a respective luma coding block and no chroma coding blocks, the quantization parameter is a luma quantization parameter, the current quantization group is a first quantization group, and the current CU is a first CU,
wherein a luma delta quantization parameter is derivable from the local quantization information for the first quantization group,
wherein the luma quantization parameter is based on the luma delta quantization parameter plus a predicted luma quantization parameter;
wherein the one or more processors are further configured to:
  determine a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;
  derive a chroma delta quantization parameter from the luma delta quantization parameter;
  add the chroma delta quantization parameter to a predicted chroma quantization parameter to derive a chroma quantization parameter;
  quantize, based on the chroma quantization parameter, a transform coefficient of a second CU, the second CU being in the second plurality of CUs; and
  include, in the bitstream, one or more syntax elements representing the quantized transform coefficient of the second CU.

52. The apparatus of claim 51, wherein the one or more processors are configured such that, as part of deriving the chroma delta quantization parameter, the one or more processors:
  determine a luma sample corresponding to a predefined or signaled chroma position such as top left chroma sample of a chroma coding block of the second CU; and
  derive the chroma delta quantization parameter such that the chroma delta quantization parameter is equal to the luma delta quantization parameter, wherein the luma delta quantization parameter is associated with the determined luma sample.

53. The apparatus of claim 51, wherein the luma delta quantization parameter is a first luma delta quantization parameter, and the one or more processors are configured such that, as part of deriving the chroma delta quantization parameter, the one or more processors:
  identify all distinct luma delta quantization parameters for luma samples corresponding to samples of a chroma block of the second CU, the identified luma delta quantization parameters including the first luma delta quantization parameter; and
  average the identified distinct luma delta quantization parameters to derive the chroma delta quantization parameter.

54. The apparatus of claim 51, wherein the luma delta quantization parameter is a first luma delta quantization parameter, and the one or more processors are configured such that, as part of deriving the chroma delta quantization parameter, the one or more processors:
  identify a plurality of distinct luma delta quantization parameters, the plurality of distinct luma delta quantization parameters including each distinct luma delta quantization parameter for luma samples corresponding to samples of a chroma block of the second CU, the plurality of distinct luma delta quantization parameters including the first luma delta quantization parameter; and
  average, in a weighted manner, the plurality of distinct luma delta quantization parameters to derive the chroma delta quantization parameter.

55. The apparatus of claim 54, the one or more processors further configured to determine, a plurality of weights, wherein for each respective weight of the plurality of weights, the respective weight corresponds to a fraction of samples of the chroma block of the second CU that correspond to a respective luma delta quantization parameter in the plurality of distinct luma delta quantization parameters,
wherein the one or more processors are configured such that, as part of averaging, in the weighted manner, the plurality of distinct luma delta quantization parameters, the one or more processors average a plurality of values, each respective value in the plurality of values being equal to a respective luma delta quantization parameter in the plurality of luma delta quantization parameters multiplied by a respective weight in the plurality of weights that corresponds to the respective luma delta quantization parameter.

56. The apparatus of claim 43, wherein the plurality of CUs is a first plurality of CUs, each respective CU of the first plurality of CUs corresponds to a respective luma coding block and no chroma coding blocks, the current quantization group is a first quantization group, the quantization parameter is a luma quantization parameter, the threshold is a first threshold, the current CU is a first CU, and the one or more processors are further configured to:
  determine a second partitioning of the CTU into a second plurality of CUs, each respective CU of the second plurality of CUs corresponding to a respective chroma coding block and no luma coding blocks, wherein the second partitioning of the CTU partitions the CTU in a different way from the first partitioning of the CTU;
  derive, based on the luma quantization parameter, a chroma quantization parameter;
  quantize, based on the chroma quantization parameter, a transform coefficient of a second CU, the second CU being in the second plurality of CUs; and
  include, in the bitstream, one or more syntax elements representing the quantized transform coefficient of the second CU.

57. An apparatus for decoding video data, the apparatus comprising:
  means for receiving, in a bitstream that comprises an encoded representation of the video data, local quantization information for a current quantization group;
  means for determining a partitioning of a coding tree unit (CTU) of a picture of the video data into a plurality of coding units (CUs), the plurality of CUs including one or more non-square CUs;
  means for deriving, based at least in part on the local quantization information for the current quantization group, a quantization parameter, wherein the current quantization group is defined as a group of successive, in coding order, CUs or coding blocks so that boundaries of the current quantization group must be boundaries of the CUs in the plurality of CUs and a size of the current quantization group is greater than or equal to a threshold, and at least one CU of the plurality of CUs is included in a non-square quantization group;

means for inverse quantizing, based on the quantization parameter, at least one transform coefficient of a current CU, the current CU being one of the CUs in the current quantization group; and means for reconstructing, based on inverse quantized transform coefficients of the current CU, a coding block of the current CU.

58. An apparatus for encoding video data, the apparatus comprising:

means for determining a partitioning of a coding tree unit (CTU) of a picture of the video data into a plurality of coding units (CUs), the plurality of CUs including one or more non-square CUs;

means for quantizing, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group;

means for signaling, in a bitstream that comprises an encoded representation of the video data, local quantization information for the current quantization group, wherein the quantization parameter is derivable based at least in part on the local quantization information for the current quantization group; and means for including, in the bitstream, one or more syntax elements representing the quantized transform coefficient of the current CU.

59. A non-transitory computer-readable storage medium storing instructions that, when executed, cause one or more processors to:

receive, in a bitstream that comprises an encoded representation of the video data, local quantization information for a current quantization group;

determine a partitioning of a coding tree unit (CTU) of a picture of the video data into a plurality of coding units (CUs), the plurality of CUs including one or more non-square CUs;

derive, based at least in part on the local quantization information for the current quantization group, a quantization parameter, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group;

inverse quantize, based on the quantization parameter, at least one transform coefficient of a current CU, the current CU being one of the CUs in the current quantization group; and reconstruct, based on inverse quantized transform coefficients of the current CU, a coding block of the current CU.

60. A non-transitory computer-readable storage medium storing instructions that, when executed, cause one or more processors to:

determine, a partitioning of a coding tree unit (CTU) of a picture of the video data into a plurality of coding units (CUs), the plurality of CUs including one or more non-square CUs;

quantize, based on a quantization parameter, at least one transform coefficient of a current coding unit (CU), the current CU being in a current quantization group or corresponding to a coding block in the current quantization group, wherein the current quantization group is defined as a group of successive, in coding order, CUs in the plurality of CUs so that boundaries of the current quantization group must be boundaries of the CUs and a size of the current quantization group is greater than or equal to a threshold, and at least one CU of the plurality of CUs is included in a non-square quantization group;

signal, in a bitstream that comprises an encoded representation of the video data, local quantization information for the current quantization group, wherein the quantization parameter is derivable based at least in part on the local quantization information for the current quantization group; and include, in the bitstream, one or more syntax elements representing the quantized transform coefficient of the current CU.

* * * * *